United States Patent
Fukuta

(10) Patent No.: US 8,228,621 B2
(45) Date of Patent: Jul. 24, 2012

(54) IMAGE PICKUP LENS, IMAGE PICKUP APPARATUS, AND MOBILE TERMINAL

(75) Inventor: Yasunari Fukuta, Osaka (JP)

(73) Assignee: Konica Minolta Opto, Inc., Tokyo (JP)

( * ) Notice: Subject to any disclaimer, the term of this patent is extended or adjusted under 35 U.S.C. 154(b) by 9 days.

(21) Appl. No.: 13/055,000

(22) PCT Filed: Jul. 22, 2009

(86) PCT No.: PCT/JP2009/063093
§ 371 (c)(1),
(2), (4) Date: Jan. 20, 2011

(87) PCT Pub. No.: WO2010/010891
PCT Pub. Date: Jan. 28, 2010

(65) Prior Publication Data
US 2011/0124373 A1    May 26, 2011

(30) Foreign Application Priority Data

Jul. 25, 2008 (JP) ................. 2008-191971

(51) Int. Cl.
G02B 9/34 (2006.01)
G02B 3/02 (2006.01)
G02B 13/18 (2006.01)
(52) U.S. Cl. ............... 359/771; 359/715; 359/773
(58) Field of Classification Search .......... 359/715, 359/771, 773
See application file for complete search history.

(56) References Cited

U.S. PATENT DOCUMENTS

2010/0220229 A1*  9/2010 Sano ................. 348/340

FOREIGN PATENT DOCUMENTS

| JP | 2006-323365 | 11/2006 |
|---|---|---|
| JP | 3946245 | 4/2007 |
| JP | 2007-122007 | 5/2007 |
| JP | 3929479 | 6/2007 |
| JP | 3976781 | 9/2007 |
| JP | 3976782 | 9/2007 |
| JP | 2007-264180 | 10/2007 |
| JP | 2007-279282 | 10/2007 |
| JP | 2008-20893 | 1/2008 |
| WO | WO 2008/102774 | 8/2008 |
| WO | WO 2008/102776 | 8/2008 |
| WO | WO 2008/108011 | 9/2008 |
| WO | WO 2009/004965 | 1/2009 |

* cited by examiner

*Primary Examiner* — Scott J Sugarman
(74) *Attorney, Agent, or Firm* — Cozen O'Connor

(57) ABSTRACT

An image pickup lens LN includes four blocks of lens blocks Ci (i=0 to 4). Lens substrate Li2 is different in material from lens portions Li1 and Li3. First lens block C1 has positive power, second lens block C2 has negative power, and fourth lens block C4 has a concave shape facing an image side in a paraxial region. At least one of lens portions with a concave shape in the paraxial region satisfies the conditional expression vn<40 (where vn is an Abbe number of a lens portion having a concave shape in the paraxial region), and first lens block C1 satisfies the conditional expression 0.5<f1/f<1.5 (where f1 is a composite focal length of the first lens block and f is a composite focal length of the total system).

20 Claims, 21 Drawing Sheets

IMAGE PICKUP LENS, IMAGE PICKUP APPARATUS, AND MOBILE TERMINAL

RELATED APPLICATIONS

This application is a U.S. National Phase Application under 35 USC 371 of International Application PCT/JP2009/063093 filed Jul. 22, 2009.

This application claims the priority of Japanese application 2008-191971 filed Jul. 25, 2008, the entire content of which is hereby incorporated by reference.

TECHNICAL FIELD

The present invention relates to an image pickup lens, an image pickup apparatus and a mobile terminal. More particularly, it relates to an image pickup apparatus for picking up an image of a subject with an image pickup element (for example, a solid-state imaging device such as an image sensor of CCD (Charge Coupled Devices) type and an image sensor of CMOS (Complementary Metal-Oxide Semiconductor) type), a mobile terminal in which the image pickup apparatus is mounted, and an image pickup lens which includes, for example, a waferscaled lens suitable for mass production, for forming an optical image on a light-receiving surface of an image pickup element.

BACKGROUND ART

A compact and thin-type image pickup apparatus has come to be mounted on a mobile terminal representing a compact and thin-type electronic hardware (such as a cell phone and PDA (Personal Digital Assistant)), whereby, it has become possible to transmit mutually not only voice information but also image information to a remote location. As image pickup elements used for these image pickup apparatuses, a solid-state imaging device such as an image sensor of a CCD type and an image sensor of a CMOS type are used.

In recent years, an image pickup element with fine pixel pitch has been employed for an image pickup apparatus with a wide angle of view to be mounted on a mobile terminal, for the purpose of downsizing of the image pickup apparatus. Such the trend continues to be furthermore accelerated. However, an image pickup element with a small pixel pitch exhibits a deteriorated SN ratio under a lower brightness condition, which becomes a cause of noise. To solve it, a development of an image pickup lens having a small F-number, and a high performance of representation has been required. At the same time, telecentricity has also been required for solving an insufficient light-amount of a ray to be formed into an image on a periphery of the image area. To respond to such the requirements, Patent Literatures 1 and 2 propose image pickup lenses in which the F-number is set to be as small as 2.4 to 2.8. Further, Patent Literatures 3 to 7 propose image pickup lenses aimed at a realization of mass production.

CITATION LIST

Patent Literature

Patent Literature 1: JP-A No. 2007-264180
Patent Literature 2: JP-A No. 2007-279282
Patent Literature 3: JP-B No. 3929479
Patent Literature 4: JP-B No. 3976781
Patent Literature 5: JP-A No. 2006-323365
Patent Literature 6: JP-B No. 3946245
Patent Literature 7: JP-B No. 3976782

SUMMARY OF INVENTION

Technical Problem

In order to realize a small F-number and a high performance of representation, correction of chromatic aberrations and other various aberrations has been tried by employing a large number of lenses such as five lenses in image pickup lenses proposed in Patent Literatures 1 and 2. However, the total length of them has been increased because of their constriction having a large number of lenses. Further, glass has been used in a part of lenses for trying the enhancement of chromatic aberrations, which has increased a cost. On the other hand, the image pickup lenses proposed in Patent Literature 3 to 7 with consideration for mass-productivity have exhibited a large F-number. Therefore, when trying to cope with a fine pixel pitch, they have caused increased noise and their performance has become insufficient to cope with an increased number of pixels.

The invention has been achieved in view of the aforesaid situations, and its object is to provide an image pickup lens which can be mass-produced at a low cost, with keeping a small F-number and high optical performance so as to cope with a fine pixel pitch of an image pickup element, and to provide an image pickup apparatus equipped with the same and a mobile terminal.

Solution to Problem

The above object is achieved by the following structures.

1. An image pickup lens comprising four or more lens blocks, wherein each of the lens blocks is assumed to be an optical element comprising a lens substrate being a parallel flat plate, and a lens portion or lens portions having positive or negative power and formed on at least one of an object-side surface and image-side surface of the lens substrate, and the lens substrate is different in material from the lens portion or lens portions, the image pickup lens being characterized in that, when the lens blocks are assumed to be, in order from an object side, a first lens block, a second lens block, a third lens block, and a fourth lens block, the first lens block has positive power, the second lens block has negative power, and a lens block arranged at a closest position to an image side has a concave shape facing the image side in a paraxial region, at least one of lens portions each having a concave shape in the paraxial region satisfies the following conditional expression (1), and the first lens block satisfies the conditional expression (3):

$$\nu n < 40 \quad (1)$$

$$0.5 < f1/f < 1.5 \quad (3)$$

where $\nu n$ is an Abbe number of a lens portion having a concave shape in the paraxial region, f1 is a composite focal length of the first lens block, and f is a composite focal length of a total system.

2. The image pickup lens of Item 1, characterized in that the at least one of lens portions satisfying the conditional expression (1) satisfies the conditional expression (2):

$$0.5 < |m/f| < 1.0 \quad (2)$$

where m is a curvature radius of the surface having a concave shape in the paraxial region, and f is the composite focal length of the total system.

3. The image pickup lens of Item 1 or 2, characterized by comprising a stop arranged at a closer position to the object side than the second lens block.

4. The image pickup lens of any one of Items 1 to 3, characterized by satisfying the following conditional expression (3a):

$$0.7<f1/f<1.2 \tag{3a}$$

where f1 is a composite focal length of the first lens block, and f is the composite focal length of the total system.

5. The image pickup lens of any one of Items 1 to 4, characterized by satisfying the following conditional expression (4):

$$-2.5<f2/f<-0.9 \tag{4}$$

where f2 is a composite focal length of the second lens block, and f is the composite focal length of the total system.

6. The image pickup lens of any one of Items 1 to 5, characterized in that
the second lens block has a convex shape facing the image side in the paraxial region.

7. The image pickup lens of any one of Items 1 to 6, characterized by satisfying the following conditional expression (5):

$$0.8<|f3/f|<3.0 \tag{5}$$

where f3 is a composite focal length of the third lens block, and f is the composite focal length of the total system.

8. The image pickup lens of any one of Items 1 to 7, characterized in that the third lens block has a concave shape facing the image side in the paraxial region.

9. The image pickup lens of any one of Items 1 to 8, characterized in that a rearmost lens surface includes an inflection point.

10. The image pickup lens of any one of Items 1 to 9, characterized by being a four-block structure.

11. The image pickup lens of Item 10, characterized in that the fourth lens block has negative power.

12. The image pickup lens of any one of Items 1 to 11, characterized by satisfying the following conditional expression (6):

$$(D1a+D2a+D3a)/f<0.35 \tag{6}$$

where D1a is a distance along an optical axis between the first lens block and the second lens block, D2a is a distance along the optical axis between the second lens block and the third lens block, D3a is a distance along the optical axis between the third lens block and the fourth lens block, and f is the composite focal length of the total system.

13. The image pickup lens of any one of Items 1 to 12, characterized in that all of the lens substrates are parallel flat plates having a same thickness.

14. The image pickup lens of any one of Items 1 to 13, characterized in that each of the lens substrates is formed of a glass material.

15. The image pickup lens of any one of Items 1 to 14, characterized in that each of the lens portions is formed of a resin material.

16. The image pickup lens of Item 15, characterized in that the resin material is an energy-curable resin material.

17. The image pickup lens of Item 15 or 16, characterized in that inorganic particles with a size of 30 nanometers or less are dispersed in the resin material.

18. The image pickup lens of any one of Items 1 to 17, characterized in that the lens blocks are manufactured by a manufacturing process comprising: a step of sealing an area between the lens substrates with a spacer member formed in a grid shape; and a step of cutting the lens substrates and the spacer member which have been joined together, along a framework of a grid of the spacer member.

19. An image pickup apparatus characterized by comprising: the image pickup lens of any one of Items 1 to 18; and an image pickup element for converting an optical image formed on an light-receiving surface into electric signal, wherein the image pickup lens is arranged so as to form an optical image of a subject on the light-receiving surface of the image pickup element.

20. A mobile terminal characterized by comprising the image pickup apparatus of Item 19.

Advantageous Effects of Invention

According to the present invention, an image pickup lens which can be mass-produced at a low cost with keeping a small F-number and high optical performance so as to cope with a fine pixel pitch of an image pickup element, image pickup apparatus equipped with the same, and a mobile terminal can be realized.

DESCRIPTION OF EMBODIMENTS

Figure 1:
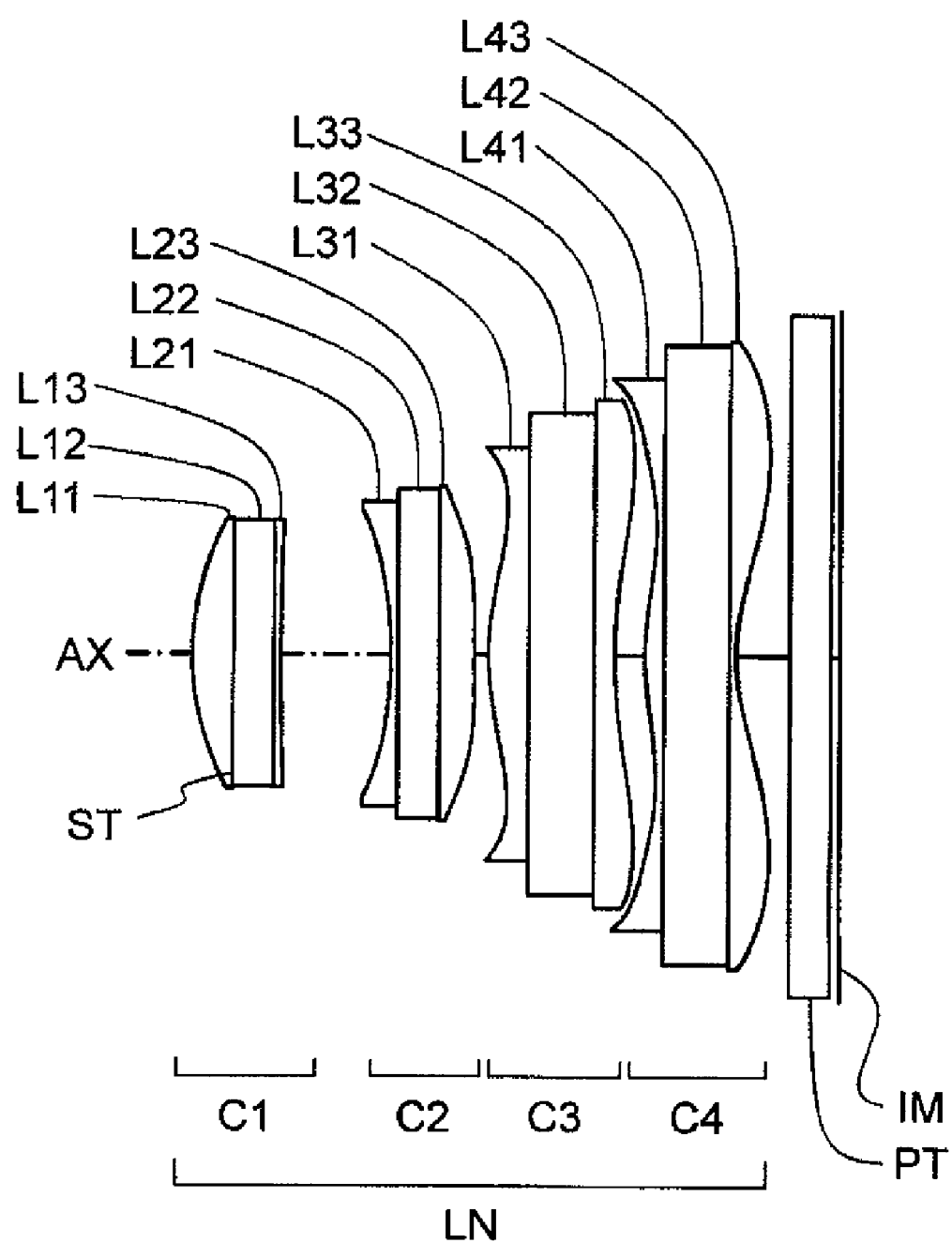
FIG. 1 is an optical construction diagram of the first embodiment (Example 1).
Figure 2:
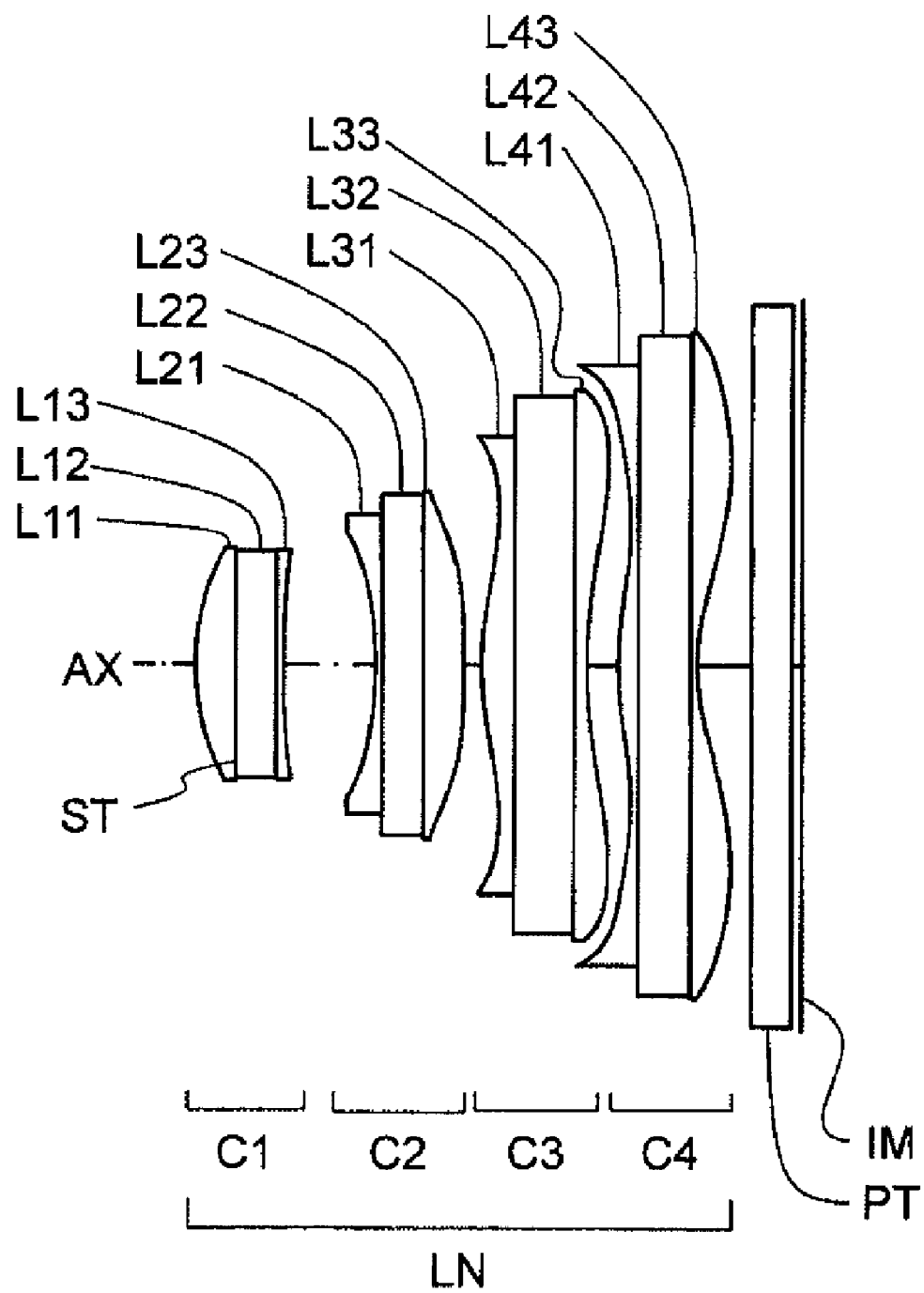
FIG. 2 is an optical construction diagram of the second embodiment (Example 2).
Figure 3:
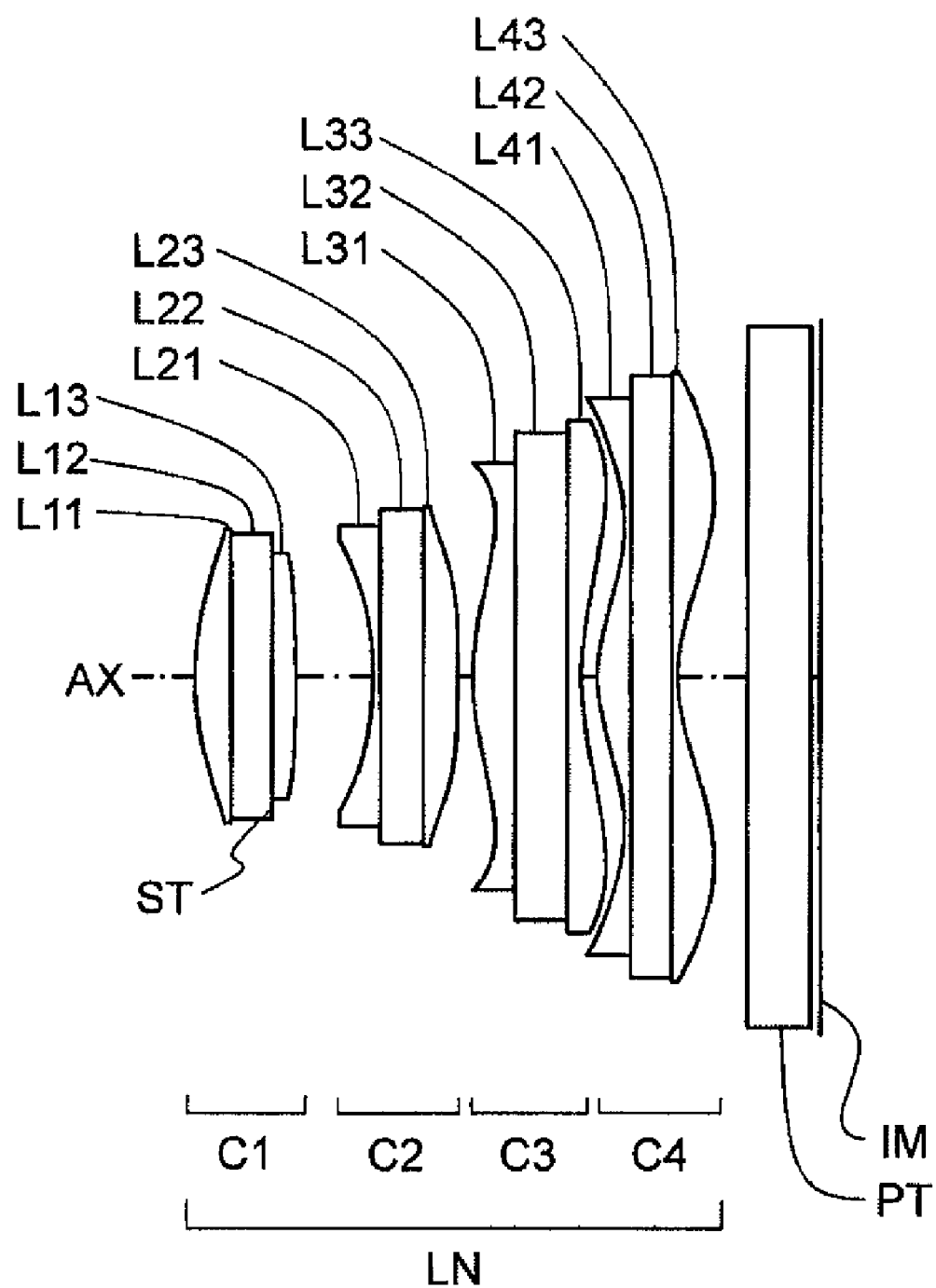
FIG. 3 is an optical construction diagram of the third embodiment (Example 3).
Figure 4:
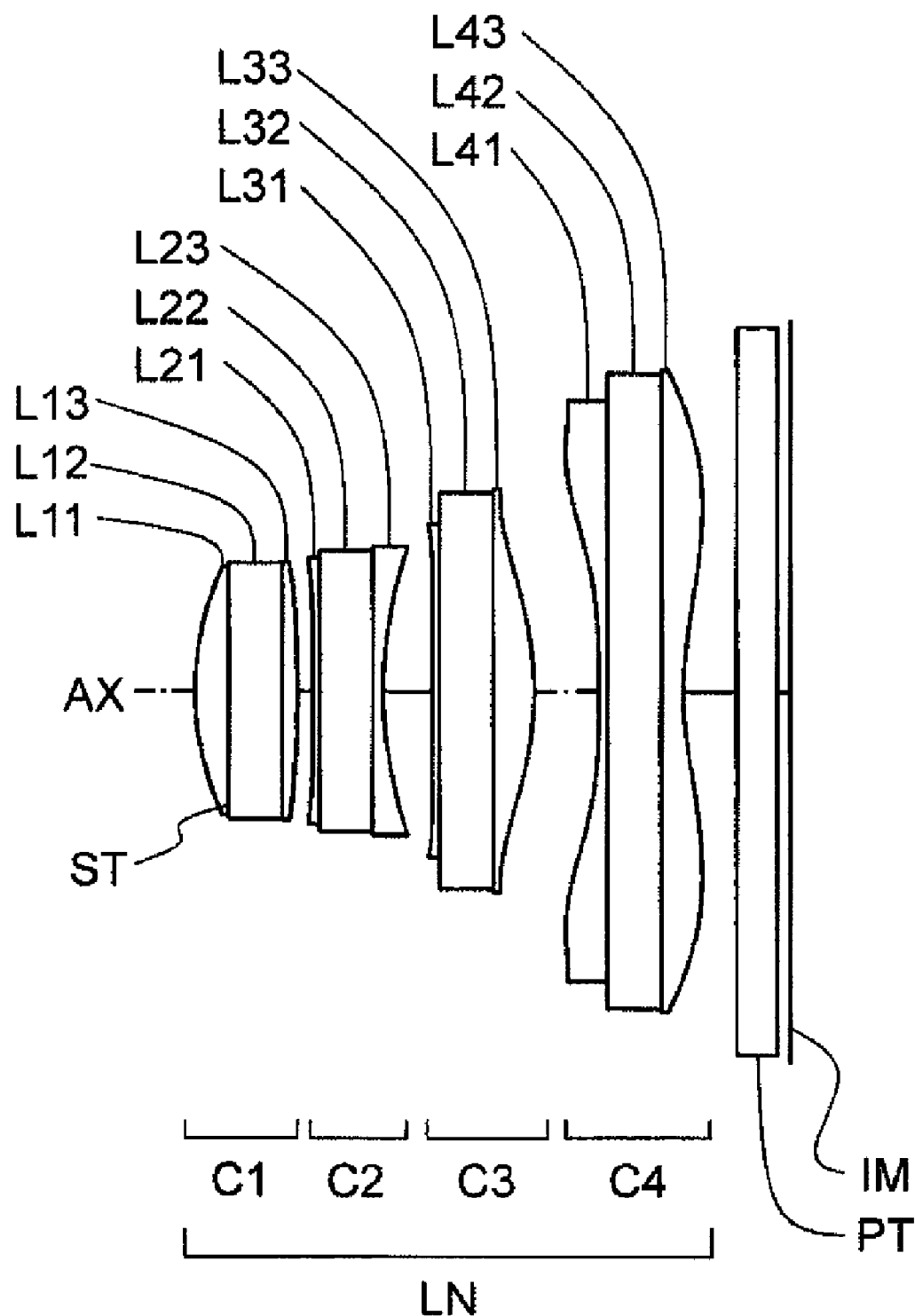
FIG. 4 is an optical construction diagram of the fourth embodiment (Example 4).
Figure 5:
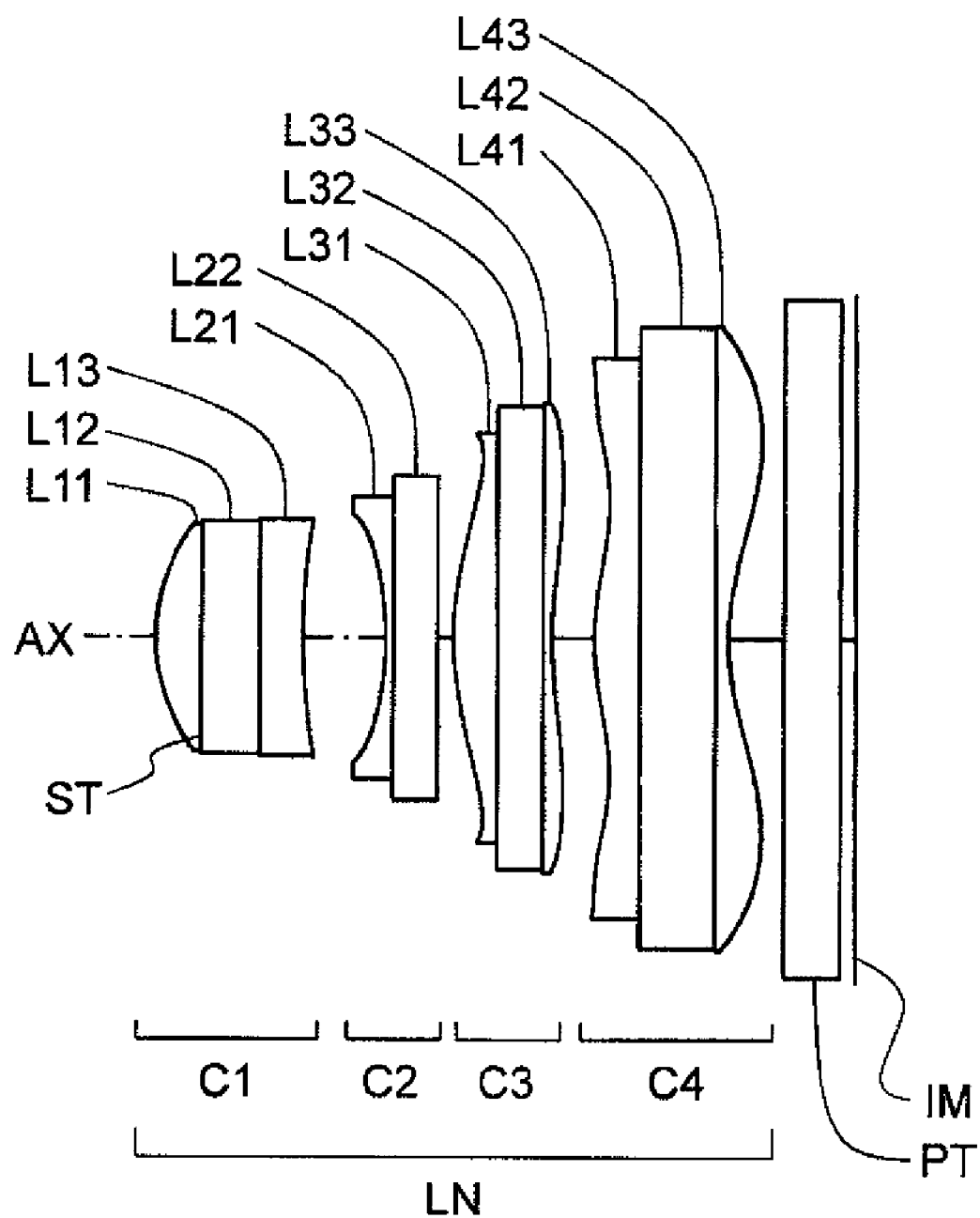
FIG. 5 is an optical construction diagram of the fifth embodiment (Example 5).
Figure 6:
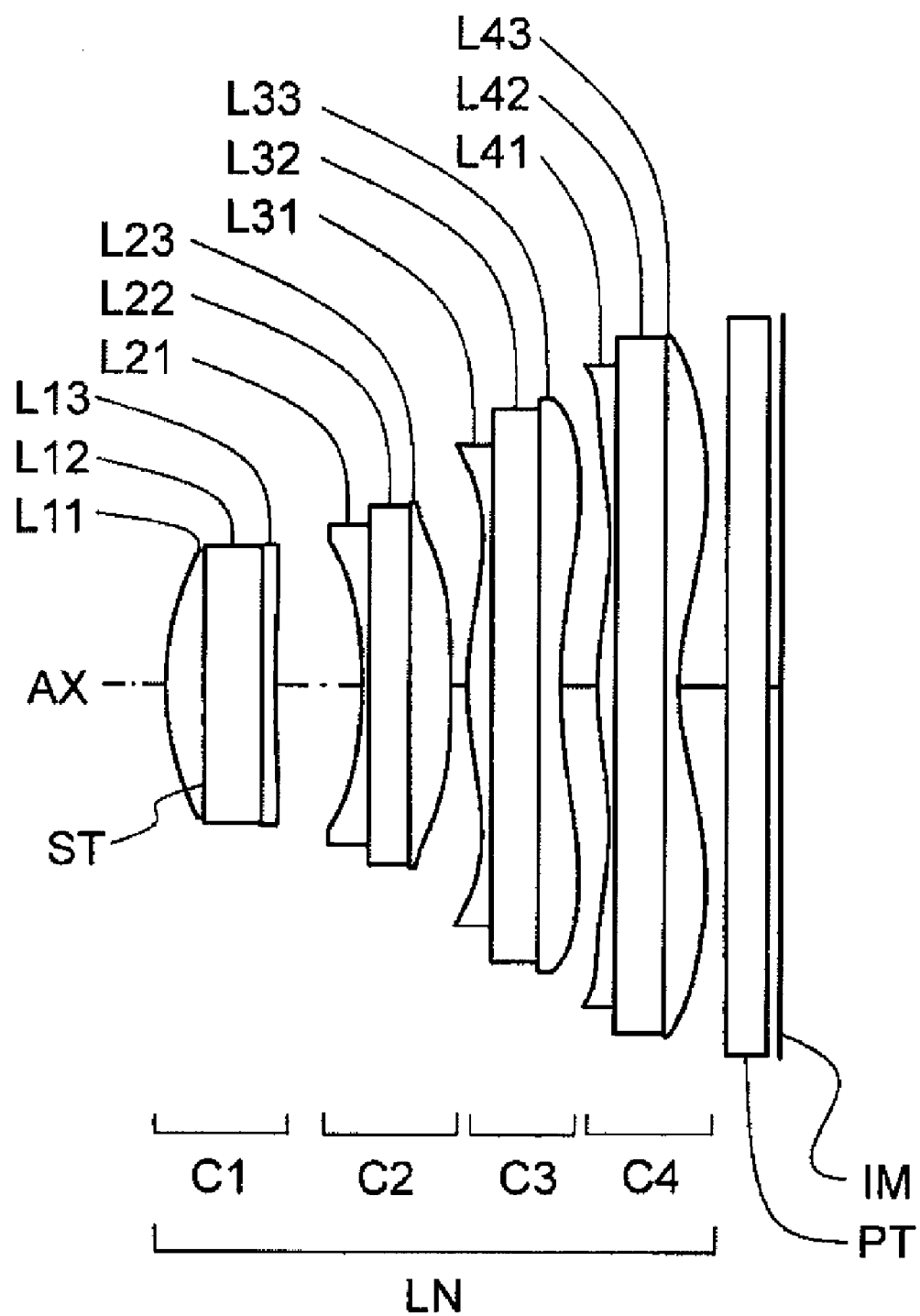
FIG. 6 is an optical construction diagram of the sixth embodiment (Example 6).
Figure 7:
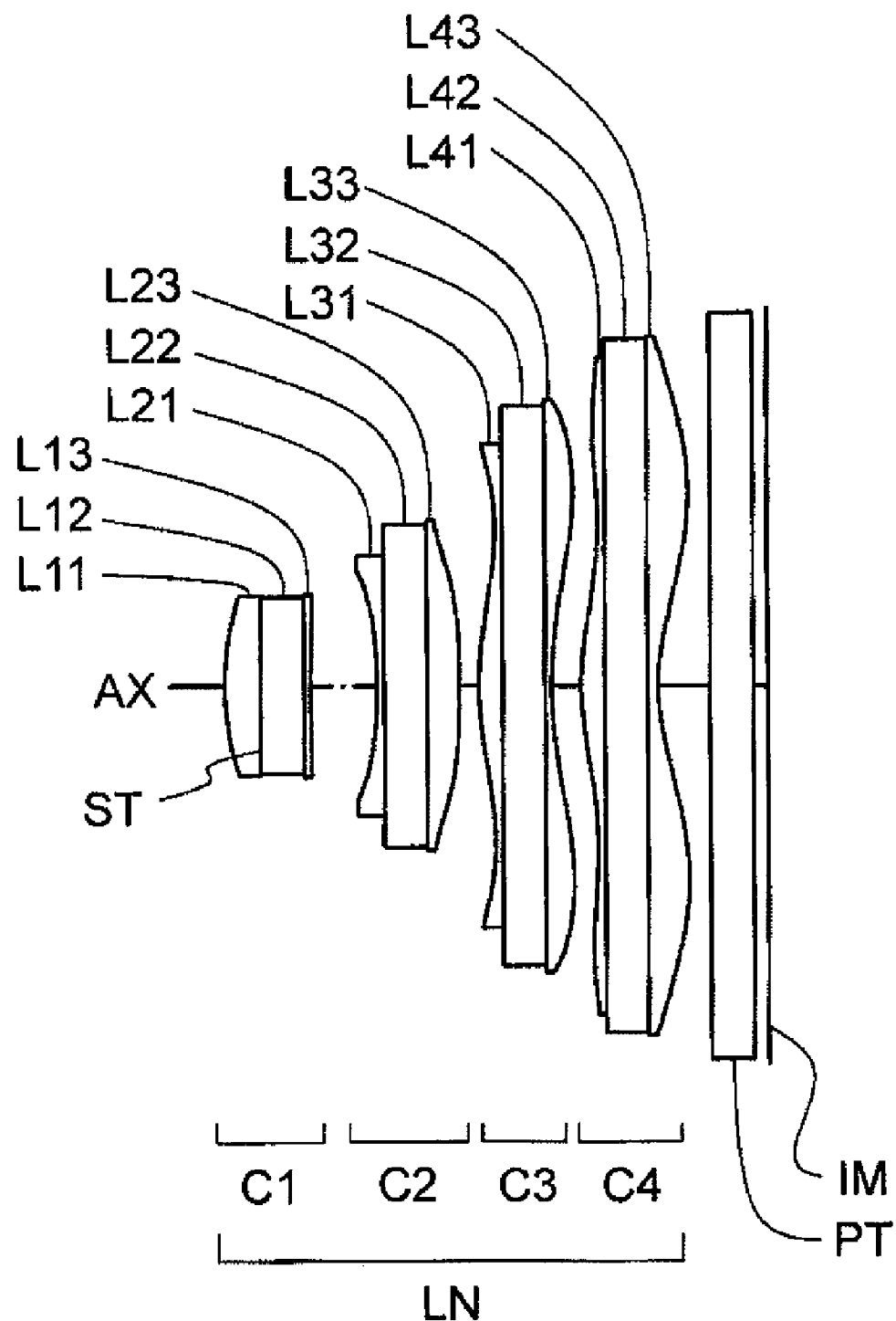
FIG. 7 is an optical construction diagram of the seventh embodiment (Example 7).
Figure 8:
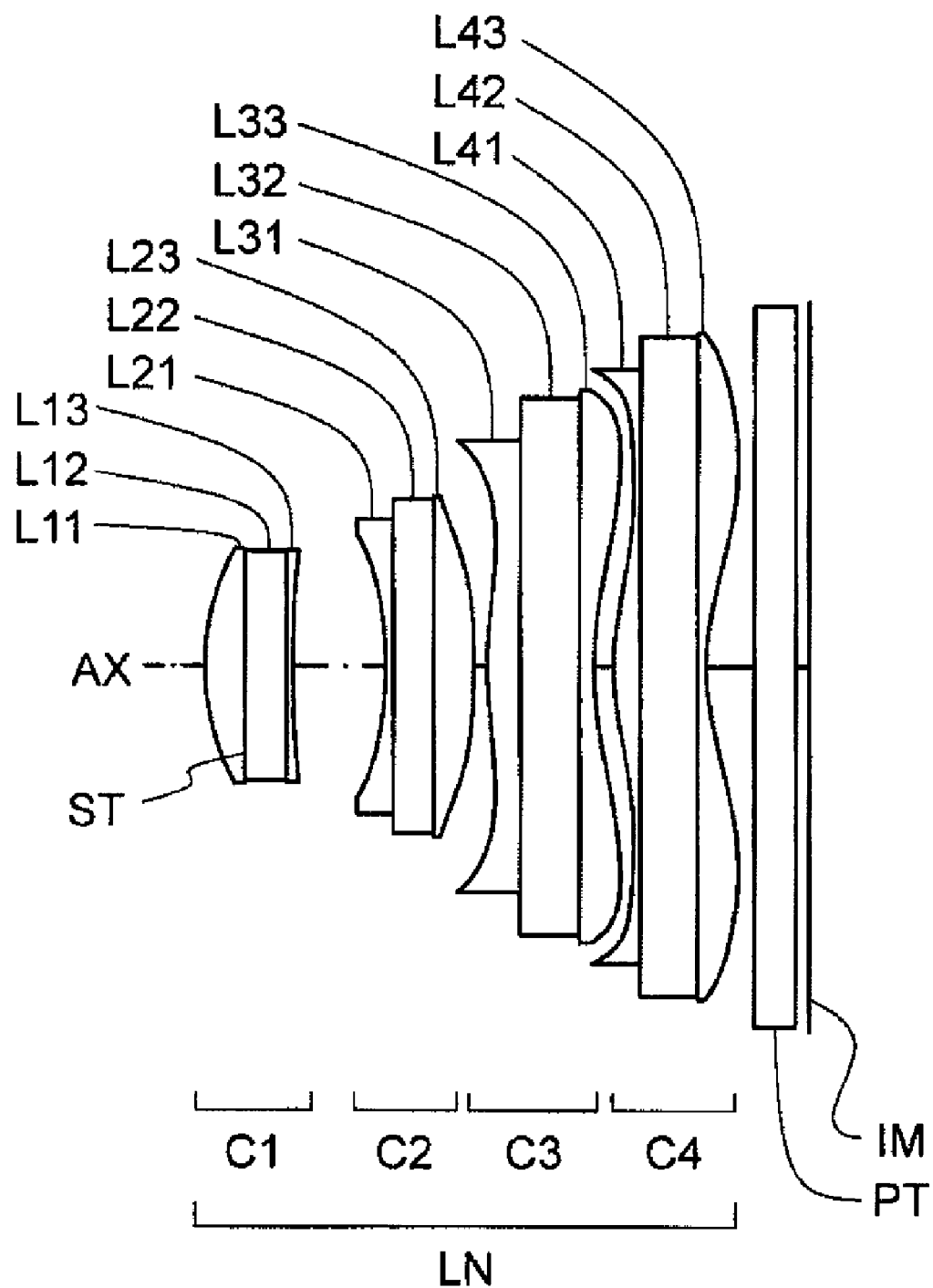
FIG. 8 is an optical construction diagram of the eighth embodiment (Example 8).
Figure 9:
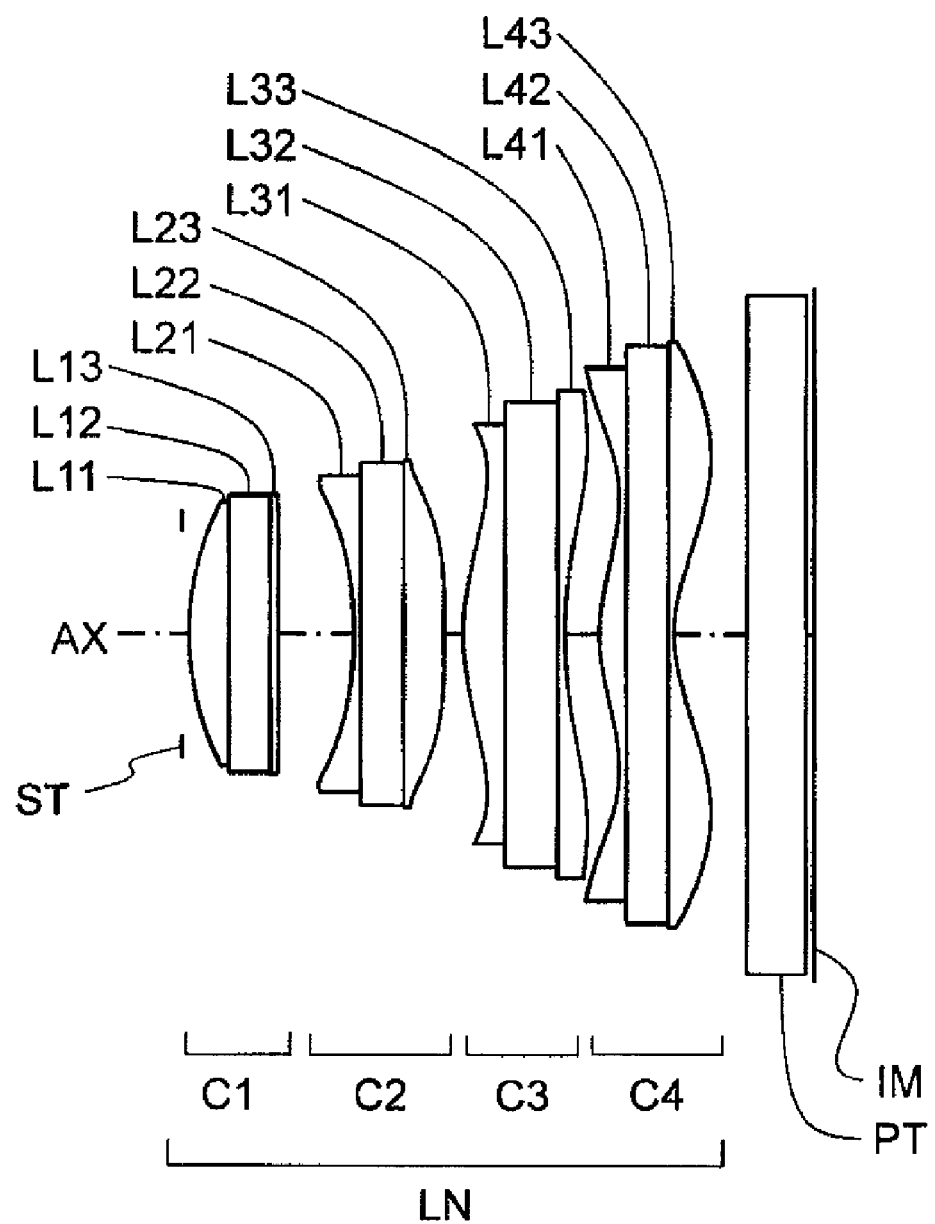
FIG. 9 is an optical construction diagram of the ninth embodiment (Example 9).
Figure 10:
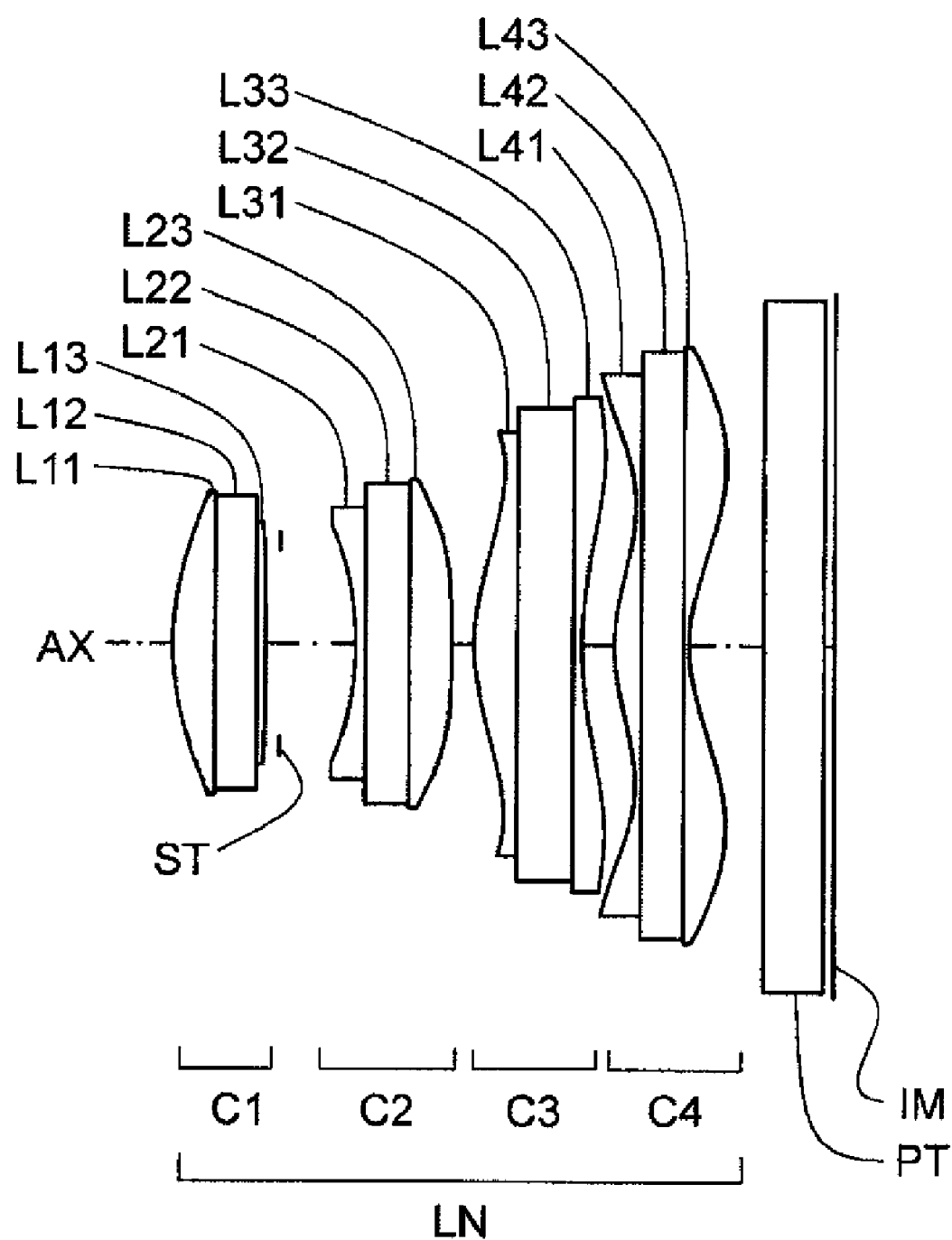
FIG. 10 is an optical construction diagram of the tenth embodiment (Example 10).
Figure 11:
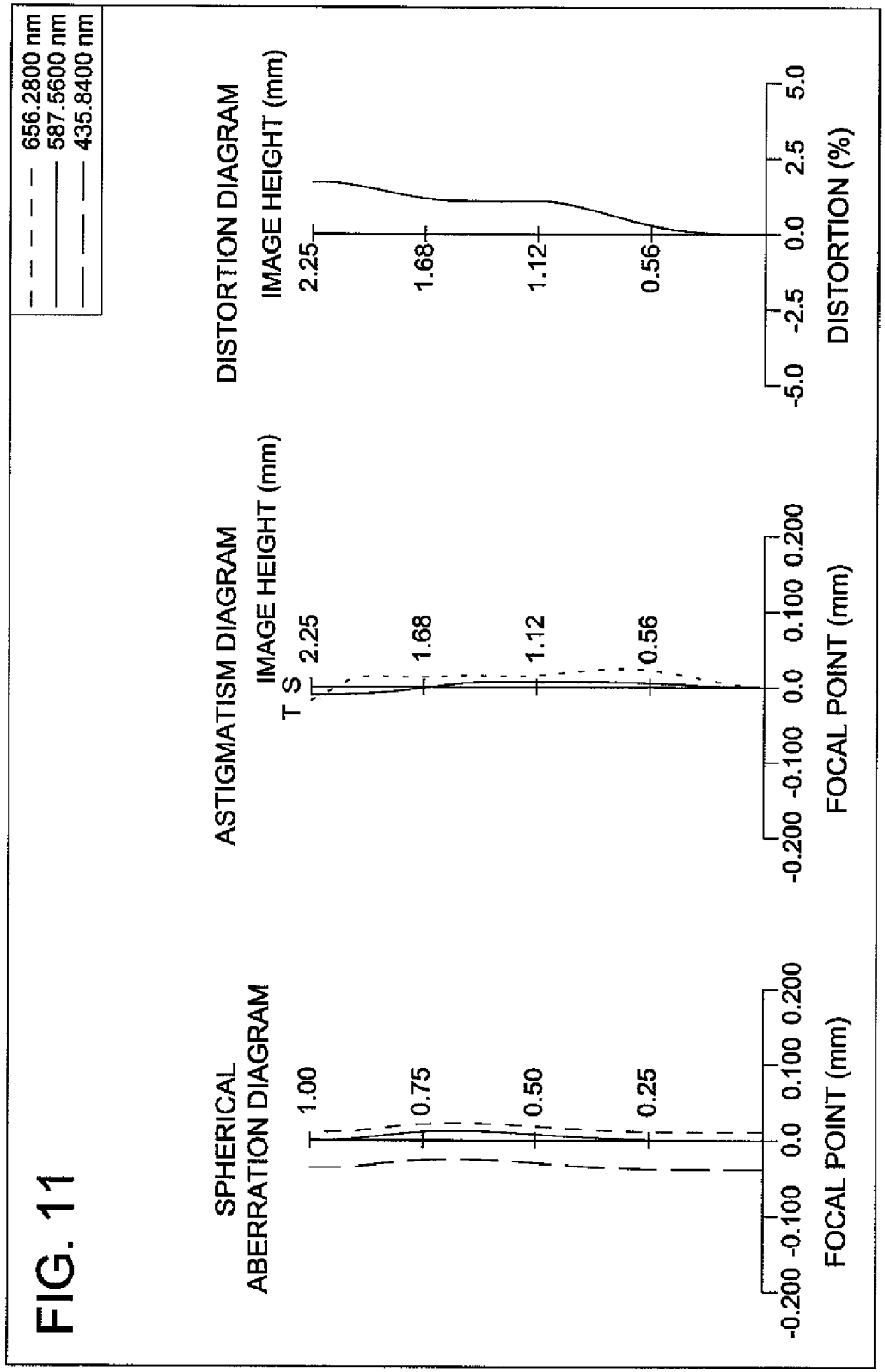
FIG. 11 shows aberration diagrams of Example 1.
Figure 12:
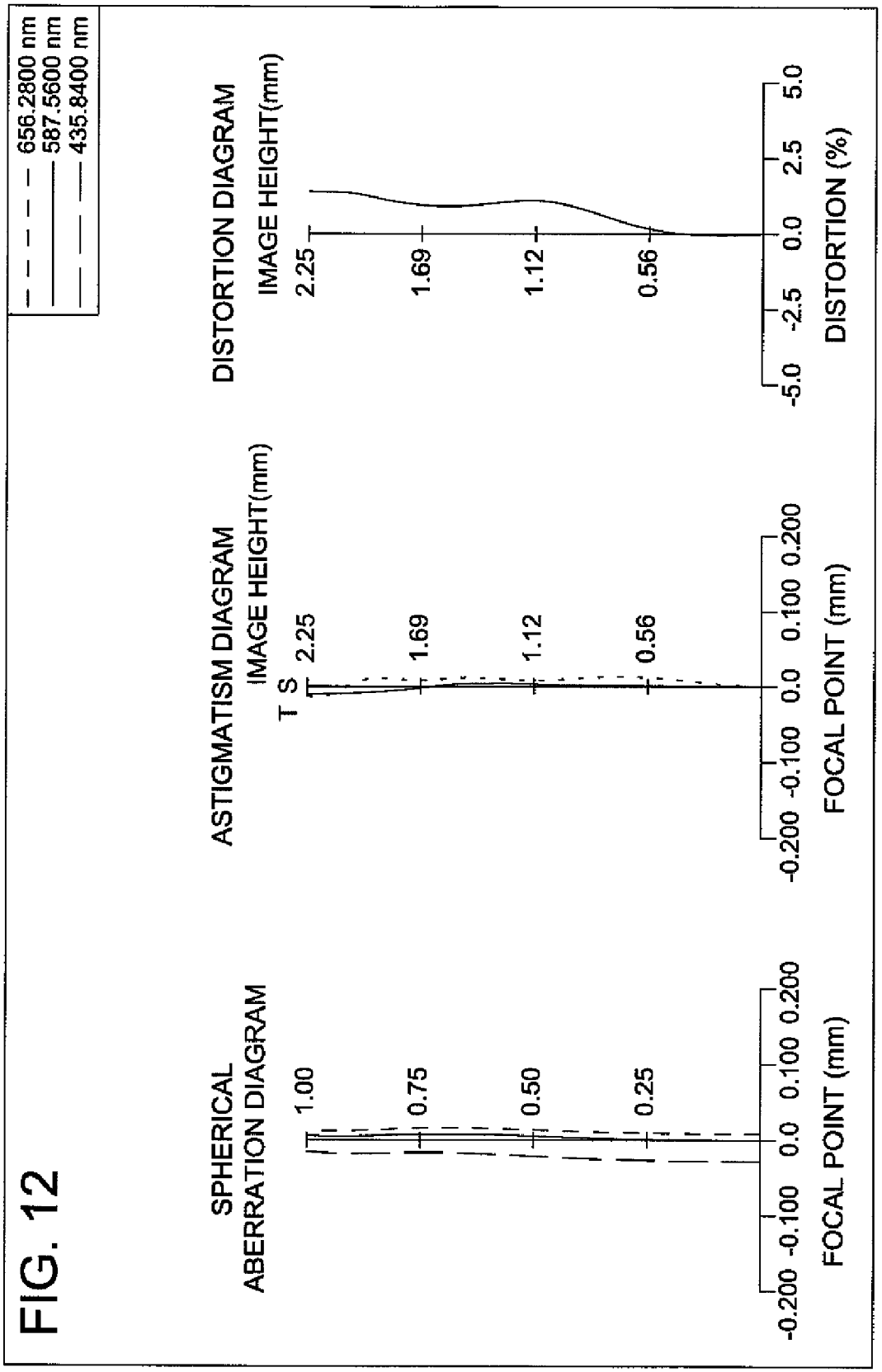
FIG. 12 shows aberration diagrams of Example 2.
Figure 13:
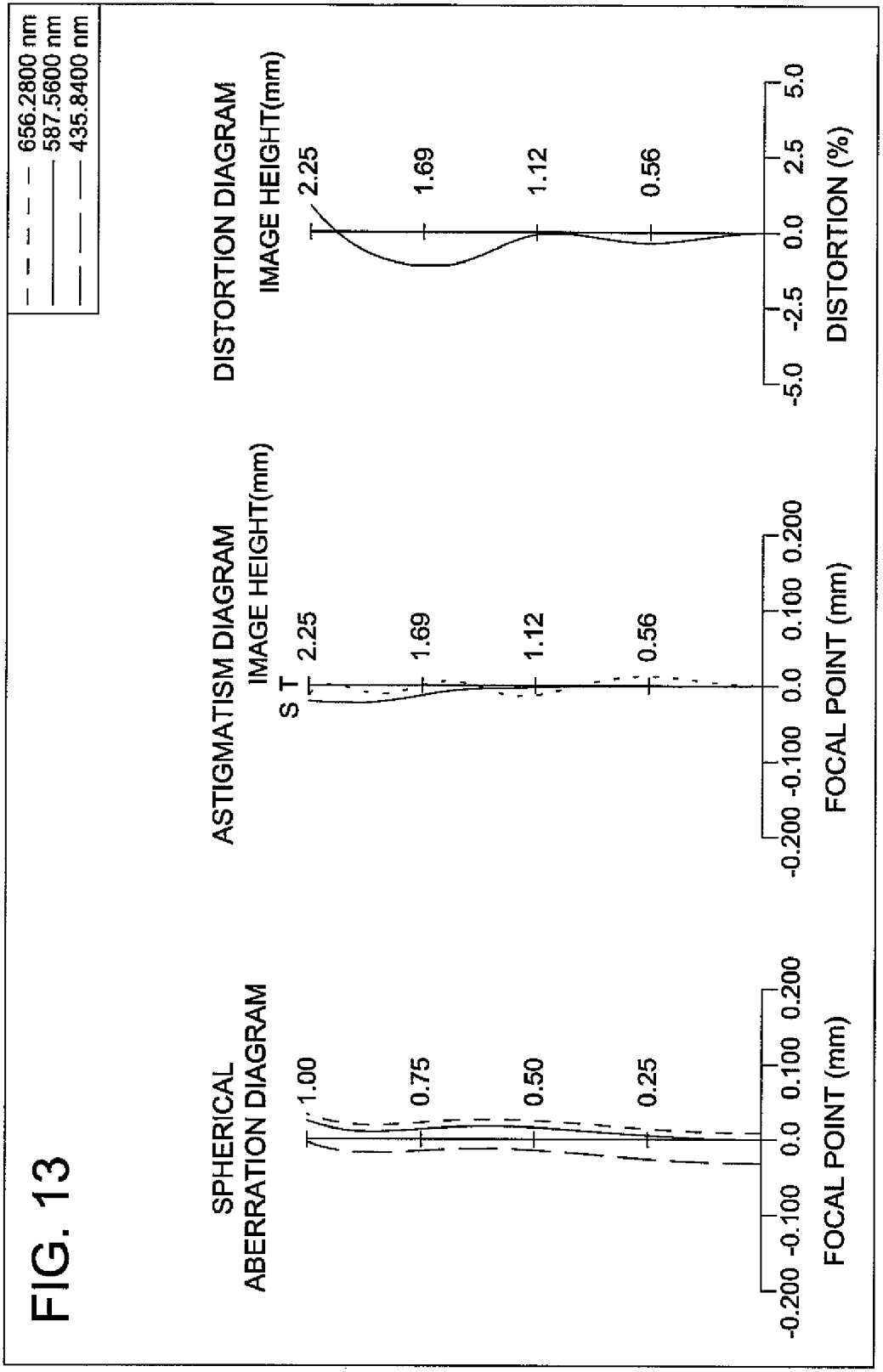
FIG. 13 shows aberration diagrams of Example 3.
Figure 14:
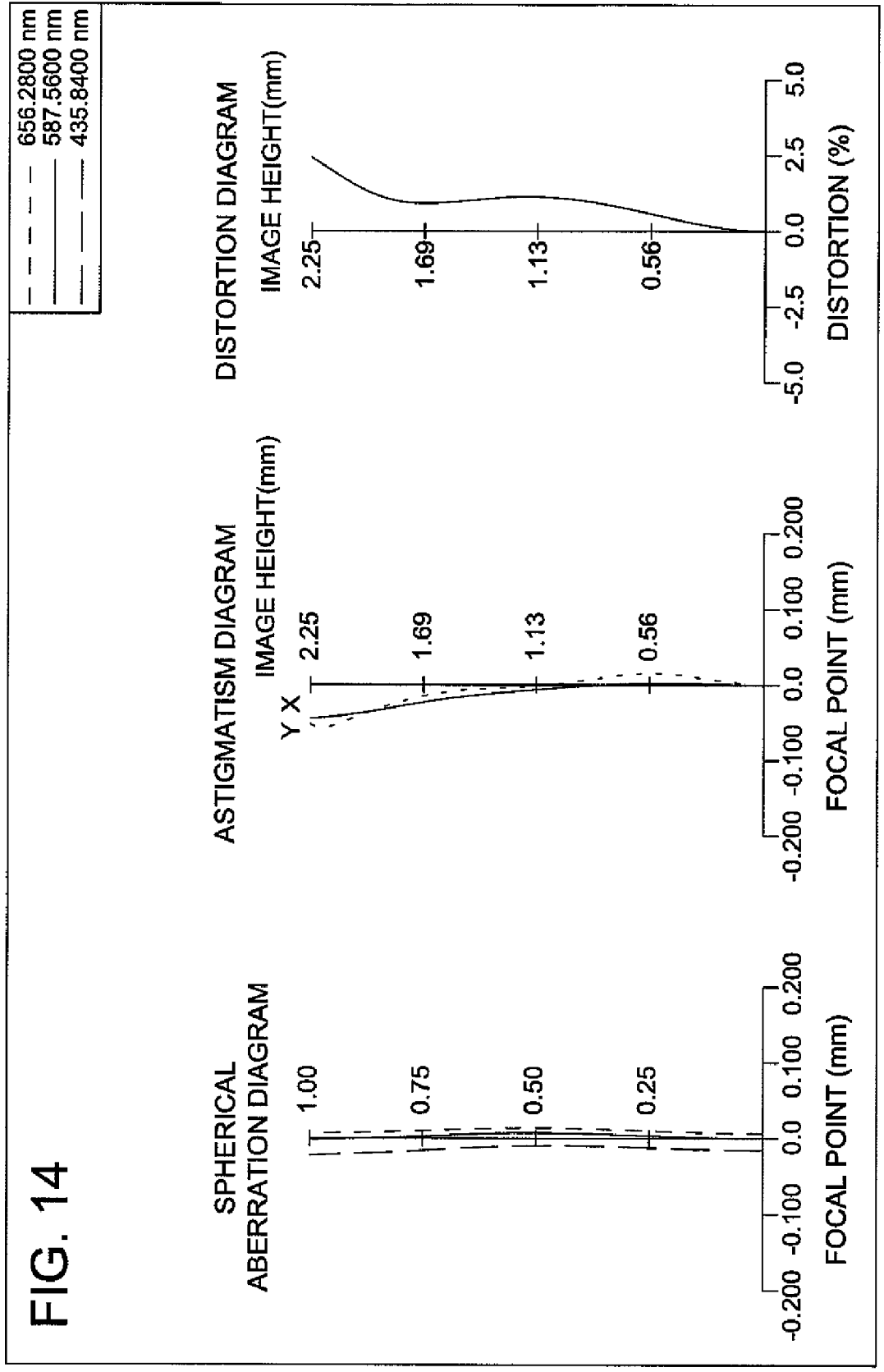
FIG. 14 shows aberration diagrams of Example 4.
Figure 15:
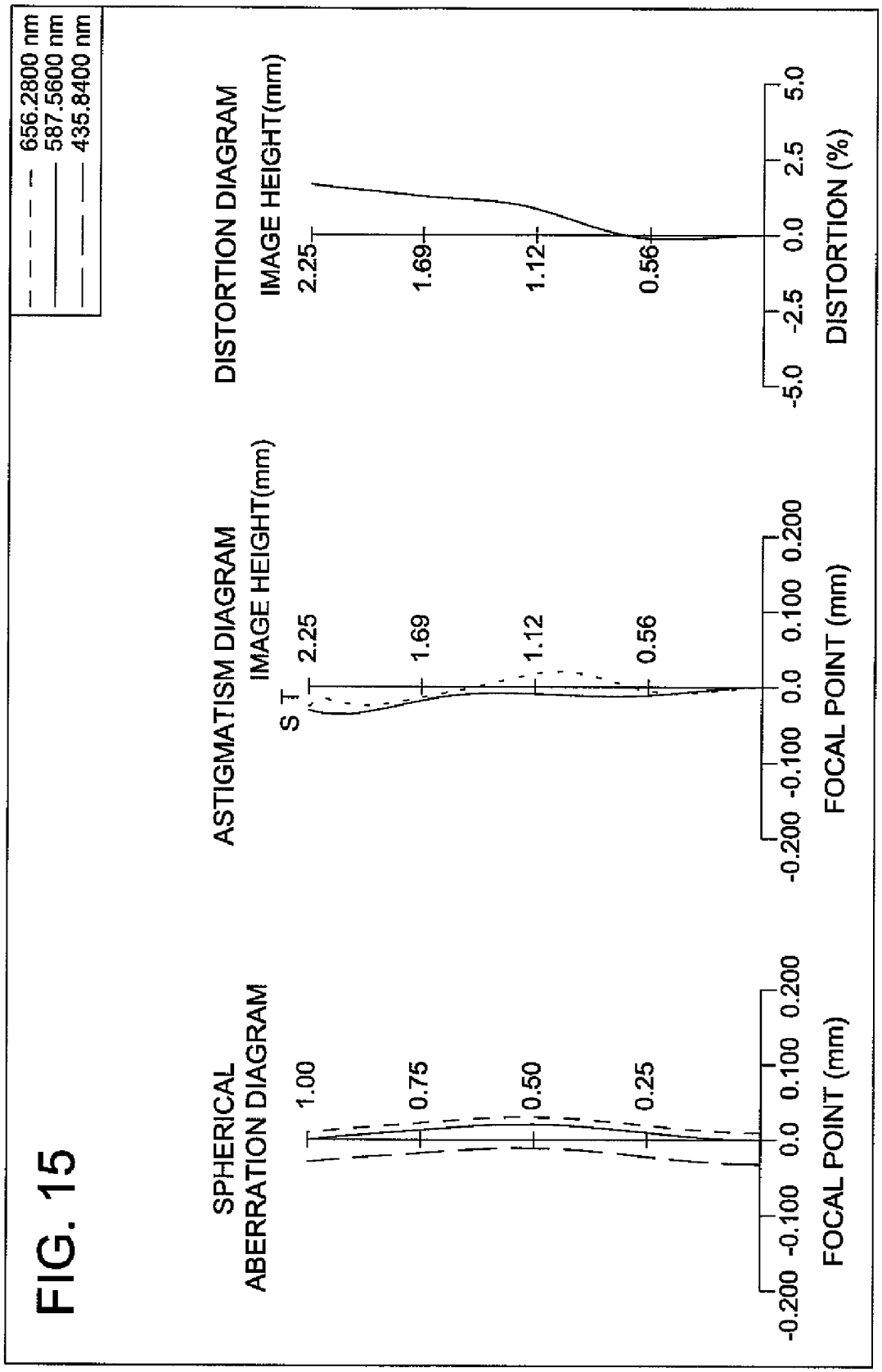
FIG. 15 shows aberration diagrams of Example 5.
Figure 16:
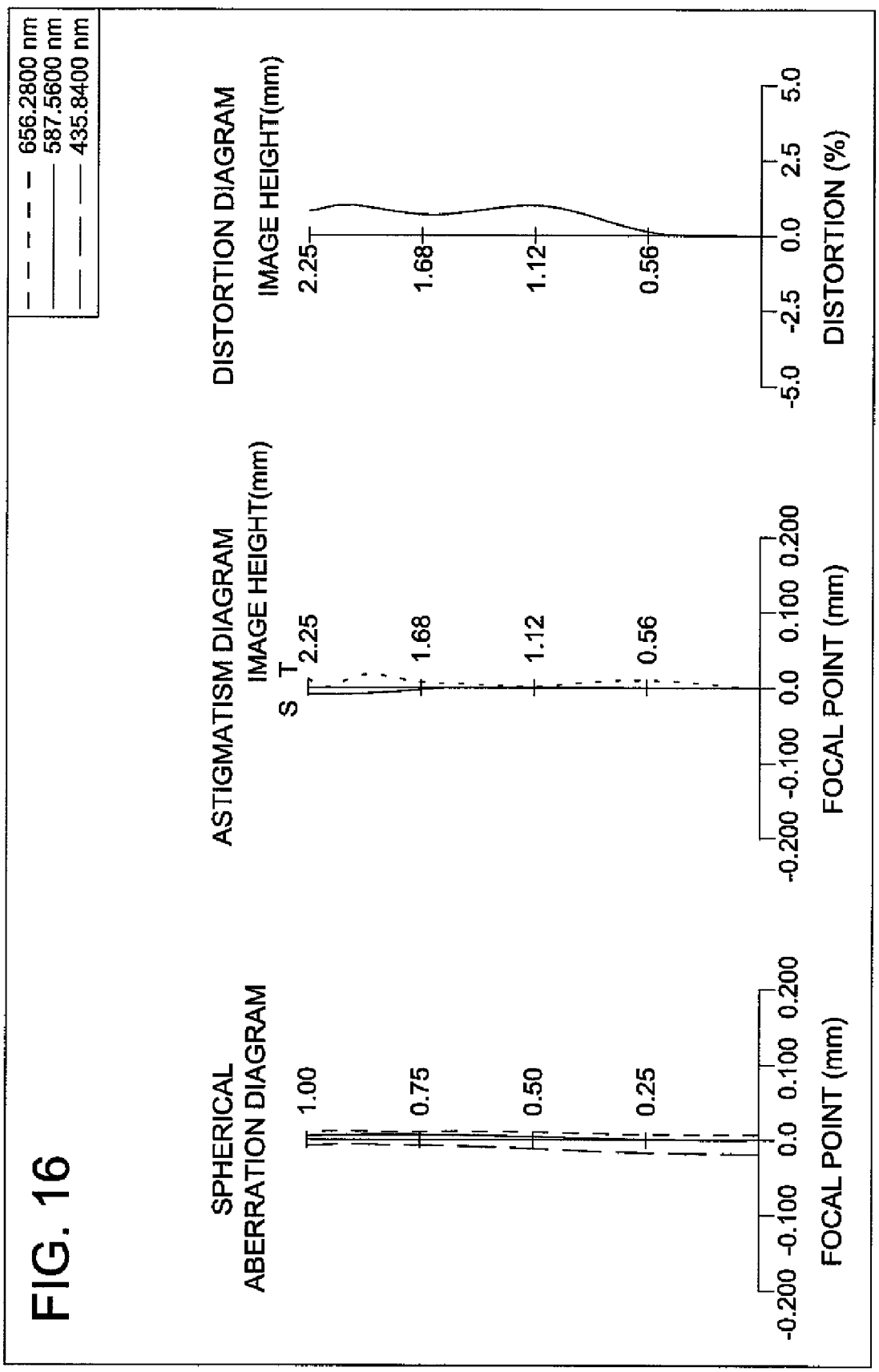
FIG. 16 shows aberration diagrams of Example 6.
Figure 17:
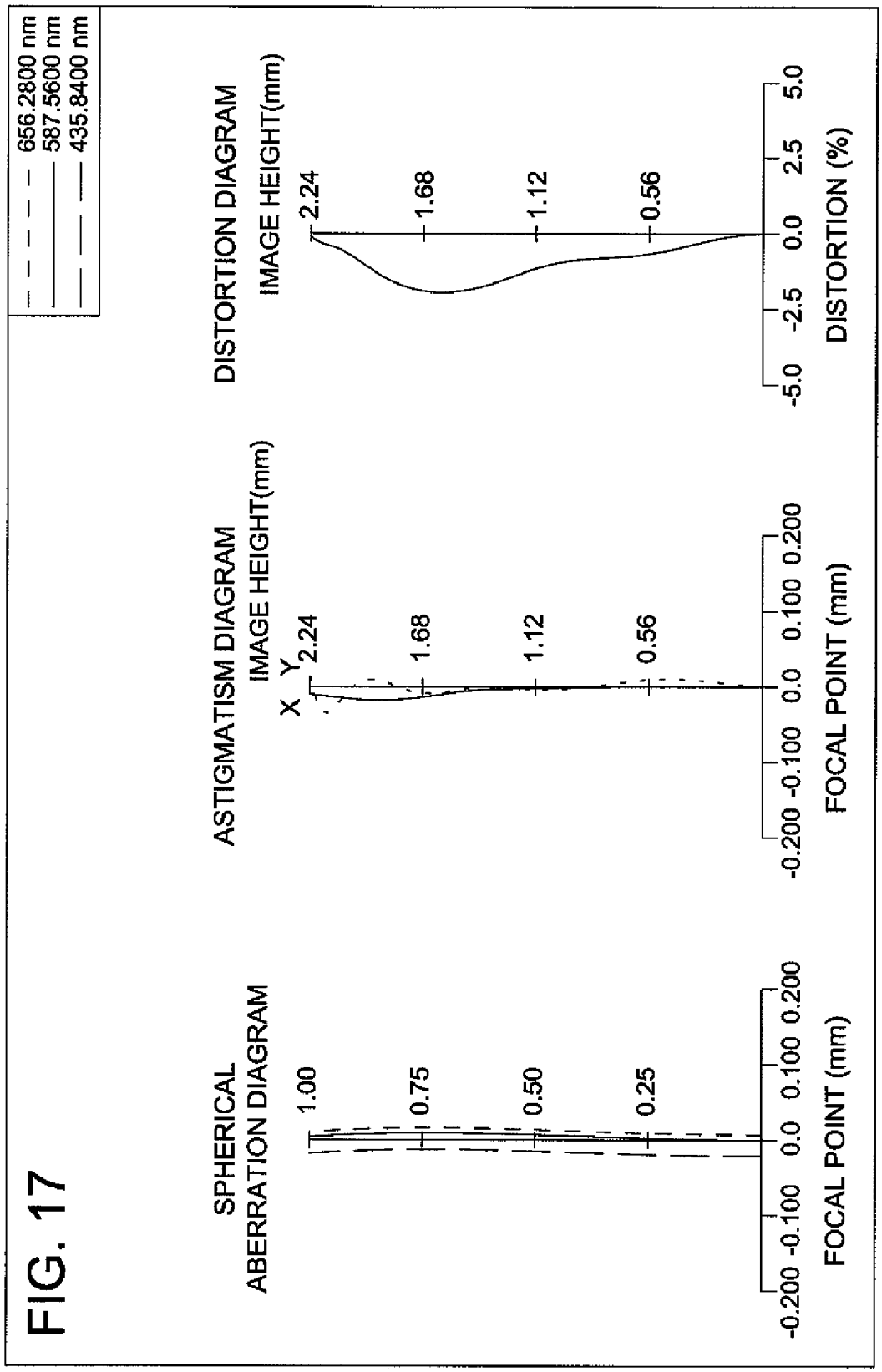
FIG. 17 shows aberration diagrams of Example 7.
Figure 18:
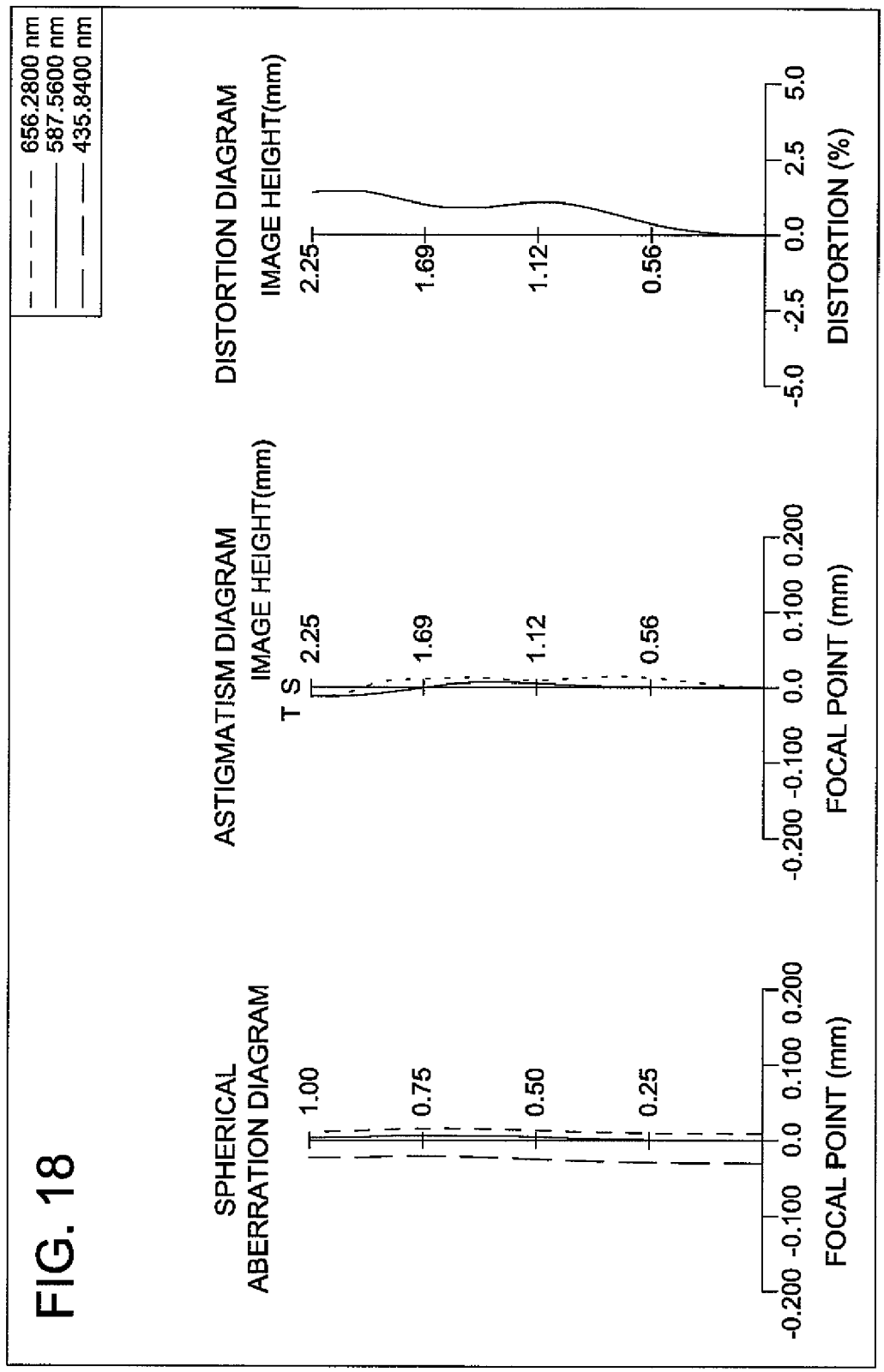
FIG. 18 shows aberration diagrams of Example 8.
Figure 19:
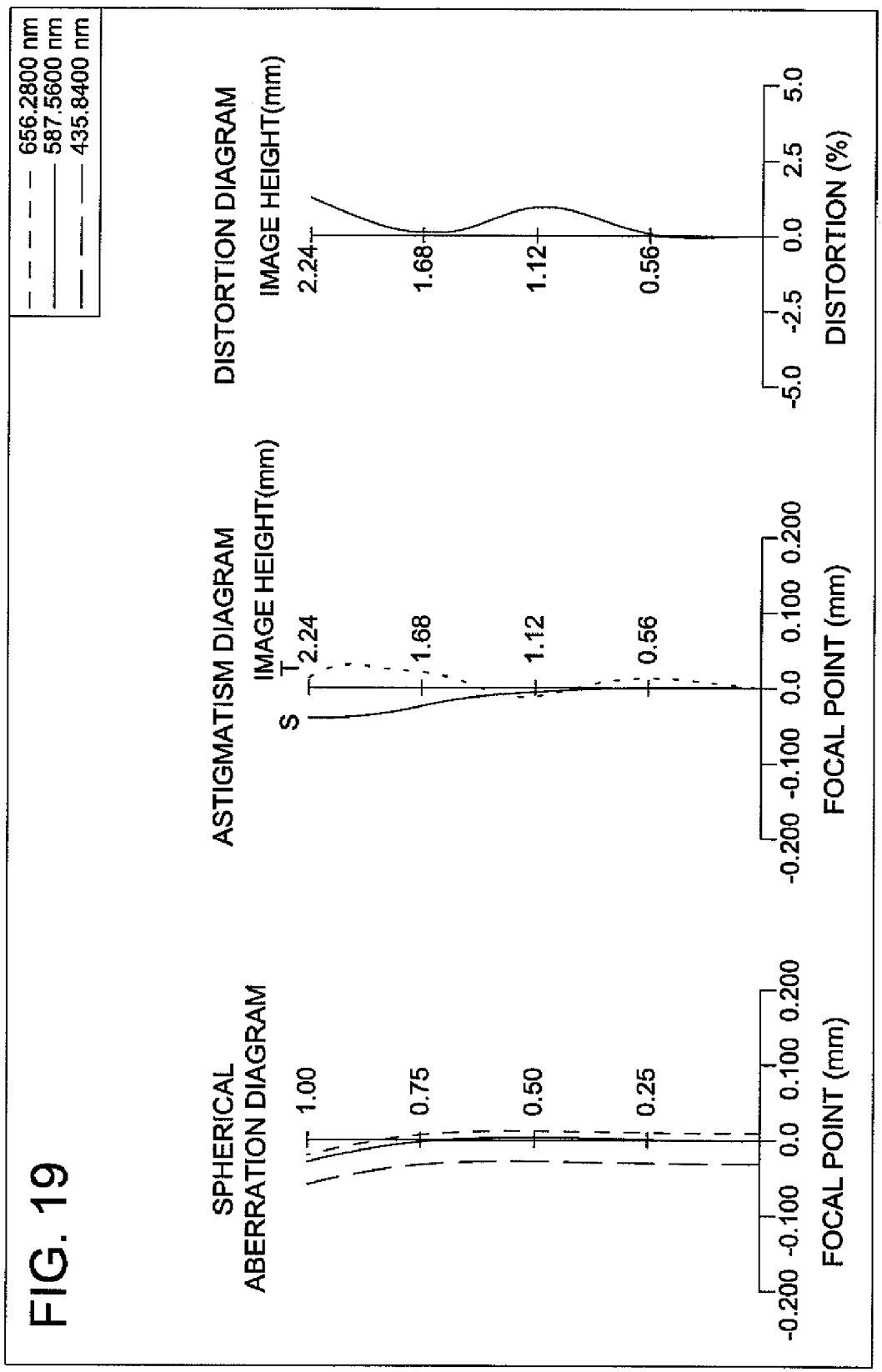
FIG. 19 shows aberration diagrams of Example 9.
Figure 20:
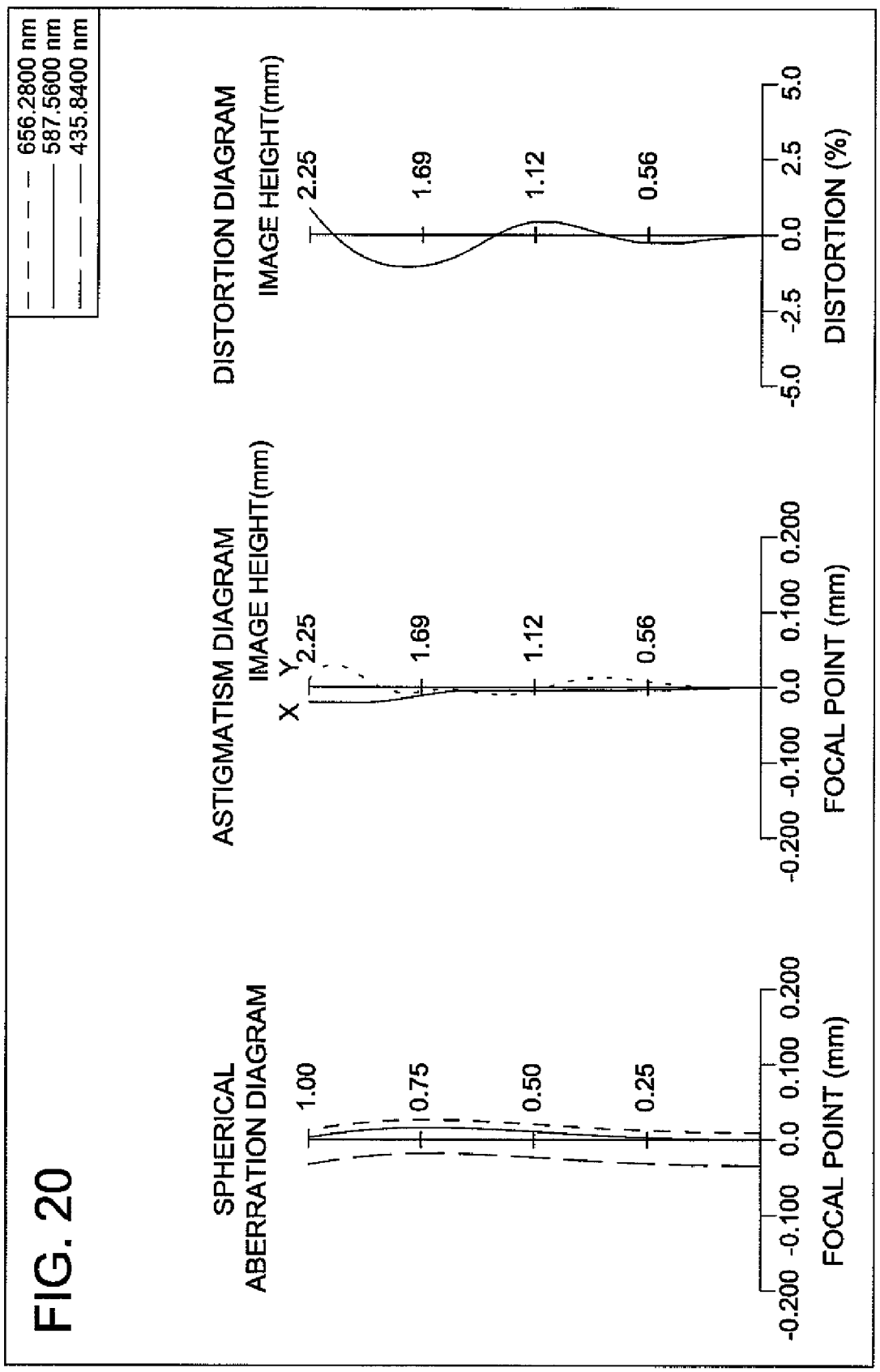
FIG. 20 shows aberration diagrams of Example 10.

An image pickup lens, image pickup apparatus and mobile terminal relating to the present invention will be described below, with referring to the drawings. The image pickup lens relating to the present invention comprises four or more of lens blocks. Herein, a "lens block" means an optical element composed of a lens substrate being a parallel flat plate, and of a lens portion or lens portions with positive or negative power formed on at least one of the object-side surface and the image side surface of the lens substrate. The lens substrate and the lens portion or lens portions which are considered in this description, are formed of different materials.

Since the image pickup lens includes four or more lens blocks as described above, under the assumption that a lens block at the i-th position (i=1, 2, . . . ) in order from the object side to the image side, is defined as an i-th lens block, the image pickup lens includes at least the first lens block, the second lens block, the third lens block, and the fourth lens block, which are arranged in this order from the object side. The first lens block has positive power and the second lens block has negative power. The lens block arranged at the closest position to the image side has a concave shape facing the image side in the paraxial region. At least one of lens portions each having a concave shape in the paraxial region satisfies the following conditional expression (1), and the first lens block satisfies the following conditional expression (3).

$$vn<40 \quad (1)$$

$$0.5<f1/f<1.5 \quad (3)$$

In these expressions, $vn$ is an Abbe number of a lens portion having a concave shape in the paraxial region, $f1$ is a composite focal length of the first lens block, and $f$ is a composite focal length of the total system.

When strong positive power is distributed to the first lens block so that the first lens block may satisfy the conditional expression (3), the length of the total system can be shortened while excellent optical performances are maintained. When the value of the conditional expression (3) becomes larger than the lower limit, the first lens block does not have excessively strong power, and various aberrations such as spherical aberration, field curvature, astigmatism, and distortion can be controlled to be small. Further, it provides an optical system with less deterioration of performance even when the first lens block is decentered. On the other hand, when the value of the conditional expression (3) becomes smaller than the upper limit, the first lens block does not have excessively weak power, and the length of the total system does not become excessively large.

Further, when at least one of lens portions each having a concave shape in the paraxial region satisfies the following conditional expression (1), chromate aberrations can be effectively controlled to be small. Even when a conventional wafer-scaled lens having a two-block or three-block structure employs a lens portion satisfying the conditional expression (1) to achieve the same level of achromatism as that of a four-block structure, the optical system including the first lens block with strong positive power naturally requires an arrangement of at least one lens with negative power to make the Petzval sum small. When such the arrangement is employed in a structure with a smaller number of lens blocks, the system naturally has a power arrangement of a typical telephoto system, which disagrees with the demand to achieve a wide angle in an image pickup lens to be mounted in a mobile terminal. Therefore, in the present invention, the system includes at least four lens blocks and positive power of the first lens block and negative power of the second lens block are shared with the other lens blocks.

Sequentially from the first lens block at the closest to the object side, the system has a structure that the first lens block has positive power to deflect a ray so as to make the ray enter the second lens block with negative power, which allows the negative power of the second lens block to be strong and makes spherical aberration, astigmatism, and Petzval sum effectively small. When the third lens block has positive power, the negative power of the second lens block can be strengthened while the positive power of the total system of the image pickup lens is maintained, which decreases spherical aberration, astigmatism, and Petzval sum more effectively. Alternatively, when the third lens block has negative power, Petzval sum can be reduced, too. Accordingly, the third lens block with any power can be intended to enhance the performance.

The structure that a lens block arranged at the closest position to an image side has a concave shape facing the image side, means that a lens portion formed on the image-side surface of a lens substrate has an image-side surface in a concave shape, in the lens block at the closest position to the image side. When the image-side surface of the lens block arranged at the closest position to the image side has a concave shape, a lens back is easily secured. A situation that an image pickup element and an image pickup lens conflict with each other and are hardly assembled, because of fluctuation of a back focal length caused by errors in a concentric optical system, can be avoided by employing this structure, which enables to achieve a compatibility of downsizing the total length and maintaining the sufficient back focal length.

Due to the above matters, even the structure with the small-sized total length and the reduced number of blocks such as four blocks, can cope with a small F-number and the increased number of pixels by correcting various aberrations to be an excellent condition.

In the present invention, it is preferable that there is provided at least one lens composed of a lens portion in a convex shape having a low dispersion and a lens portion in a concave shape having a high dispersion within the range determined by the conditional expression (1) in the same lens block. Thereby, chromatic aberrations can be corrected in one lens block and chromatic aberrations can be effectively corrected without losing an ability of correcting the other various aberrations.

Even when a small F-number is achieved by the above structure, there is a tendency that sensitivity to a manufacturing error becomes large, as a result of being combined with an effect of downsizing of a pixel pitch. Therefore, lens portions are arranged on a lens substrate being a parallel flat plate so as to realize the reduction of tilt decentration caused by in an assembling process by using the advantage of accuracy of the parallel flat plate in shape. Because a parallel flat plate is obtained by being cut out from quite larger member than the lens portions, unevenness of each lens in shape can be controlled to be smaller than small lenses. Further, because it can be cut out after plural lens portions are arranged on one large parallel flat plate, adjustment of shift decentration is not required for individual lenses. A shift decentration in several lenses among all the lenses is adjusted by adjusting each lens substrate as a parallel flat plate. Thereby, the shift decentration can be minimized in each lens. Accordingly, even when the sensitivity to manufacturing error is high because of providing small-sized pixel pitch and small F-number and of employing a large number of lenses such that four or more lenses, mass production can be achieved with high accuracy at a low cost.

According to the above characterized structures, there can be realized an image pickup lens and an image pickup apparatus equipped with the same, where the image pickup lens has a high optical properties and can be mass-produced at a low cost even if its F-number is made to be small in order to employ an image pickup element with a fine pixel pitch.

When the image pickup apparatus equipped with the image pickup lens is used for a digital device such as a mobile terminal, it can contribute to downsizing, saving cost, and enhancement of performance. Conditions for obtaining such the effects in a balanced condition and for achieving higher optical performance and smaller size of the total system will be described below.

It is more preferable that the following conditional expression (1a) is satisfied.

$$vn<35 \qquad (1a)$$

The conditional expression (1a) defines a more preferable conditional range based on the above view points, out of the conditional range defined by the conditional expression (1).

It is preferable that the at least one of lens portions satisfying the conditional expression (1) satisfies the conditional expression (2).

$$0.5<|m/f|<1.0 \qquad (2)$$

In the expression, m is a curvature radius of a surface having a concave shape in the paraxial region, and f is a composite focal length of the total system.

When the value of the conditional expression (2) becomes larger than the lower limit, the curvature does not become excessively great and decentration sensitivity of the lens surface can be reduced. On the other hand, when the value of the conditional expression (2) becomes smaller than the upper limit, chromatic aberrations can be reduced effectively.

It is more preferable that the following conditional expression (2a) is satisfied.

$$0.5<|m/f|<0.8 \qquad (2a)$$

The conditional expression (2a) defines more preferable conditional range based on the above view points, out of the conditional range defined by the conditional expression (2). When the value of the conditional expression (2a) becomes smaller than the upper limit, chromatic aberrations can be reduced more effectively.

It is furthermore preferable that the following conditional expression (2b) is satisfied.

$$0.5<|m/f|<0.7 \qquad (2b)$$

The conditional expression (2b) defines further more preferable conditional range based on the above view points, out of the conditional range defined by the conditional expression (2). When the value of the conditional expression (2b) becomes smaller than the upper limit, chromatic aberrations can be reduced furthermore effectively.

There is preferably provided a stop arranged at a closer position to the object side than the second lens block. When a stop is arranged at a closer position to the object side than the second lens block, the stop can be separated away from the image plane and the telecentricity can be enhanced.

The stop is preferably positioned on the lens substrate in the first lens block. The condition that the stop is positioned on the lens substrate in the first lens block means that the stop is arranged inside the lens. Thereby, unwanted light which is generated when light reflects at the outside of the effective aperture of the lens portion arranged at a closer position to the object side than the stop, can be eliminated effectively. The stop to be arranged may be a molded plate formed of resin or glass, or may be formed by coating a lens substrate with a dielectric material.

The stop is preferably positioned on the object-side surface of the lens substrate in the first lens block. When the stop is positioned on the object-side surface of the lens substrate in the first lens block, unwanted light can be blocked and the telecentricity can be enhanced at the same time, because the stop can be separated away from the image plane.

It is preferable that the following conditional expression (3a) is satisfied and it is more preferable that the following conditional expression (3b) is satisfied.

$$0.7<f1/f<1.2 \qquad (3a)$$

$$0.8<f1/f<1.1 \qquad (3b)$$

These conditional expressions (3a) and (3b) define more preferable conditional ranges based on the above view points, out of the conditional range defined by the conditional expression (3). For example, when the value of the conditional expressions (3a) becomes larger than the lower limit, the power of the first lens block does not become excessively strong and various aberrations such that spherical aberration, field curvature, astigmatism, and distortion can be controlled to be small. Further, there can be provided an optical system with less deterioration of performance even when the first lens block is decentered. On the other hand, when the value of the conditional expression (3a) becomes smaller than the upper limit, the first lens block does not have excessively weak power, and the length of the total system does not become excessively large. When the conditional expression (3b) is satisfied, the above matters become more effective.

It is preferable that the following conditional expression (4) is satisfied.

$$-2.5<f2/f<-0.9 \qquad (4)$$

In the expression, f2 is a composite focal length of the second lens block, and f is a composite focal length of the total system.

When the value of the conditional expression (4) becomes larger than the lower limit, Petzcal sum is prevented to be excessively large and the generation of curvature field can be reduced. On the other hand, when the value of the conditional expression (4) becomes smaller than the upper limit, the power of the second lens block does not become excessively strong, and there can be provided an optical system with less deterioration of performance even when the second lens block is decentered.

It is preferable that the second lens block has a convex shape facing the image side in the paraxial region. When the second lens block has a convex shape facing the image side in the paraxial region, the position of the principal point of the second lens block can be separated away from the first lens block, and the power of the first lens block and the power of the second lens block can be reduced. In the present invention, the first lens block and the second lens block have a tendency to make the deterioration of performance large because of their decentration, compared with the other lens blocks. Therefore, the optical system with small deterioration of performance can be obtained effectively.

It is preferable that the second lens block has a meniscus shape whose convex surface faces the image side in the paraxial region. When the second lens block has a meniscus shape, the position of the principal point of the second lens block can be separated further away from the first lens block, and the power of the first lens block and the power of the second lens block can be reduced. Thereby, the optical system with much less deterioration of performance can be obtained, even when the first lens block and the second lens block are decentered.

It is preferable that the following conditional expression (5) is satisfied.

$$0.8<|f3/f|3.0 \qquad (5)$$

In the expression, f3 is a composite focal length of the third lens block, and f is a composite focal length of the total system.

When the value of the conditional expression (5) becomes larger than the lower limit, the power of the third lens block does not become excessively large, which provides a lens with small decentration of performance when the third lens block is decentered. On the other hand, when the value of the conditional expression (5) becomes smaller than the upper limit, the power of the third lens block does not become excessively weak, and various aberrations can be corrected in an excellent condition.

It is preferable that the third lens block has a concave shape facing the image side in the paraxial region. When the third lens block has a concave shape facing the image side in the paraxial region, the back focal length is easily secured. Even when the fourth lens block is arranged, the enough back focal length can be secured.

It is preferable that the image-side surface of the third lens block has a concave shape facing the image side in the paraxial region and the surface includes an inflection point. When the image-side surface of the third lens block includes an inflection point, it makes a light flux to be formed into an image on a periphery of the image area, enter the lens surface at an almost right angle. Thereby, generation of various aberrations can be reduced.

It is preferable that the rearmost lens surface includes an inflection point, and is more preferable that the rearmost lens surface has a concave shape in the paraxial region. When the rearmost lens surface forms a concave shape in the paraxial region and has an inflection points in the peripheral region, the lens surface can provide a divergent action to a ray around the paraxial region and provide a convergent action to an off-axis ray to be formed into an image in the periphery of an image pickup element. Thereby, the telecentricity in the peripheral region of the image area can be enhanced with the enough back focal length being secured.

It is preferable that the image pickup lens is a four-block structure. When forming the image pickup lens as a four-block structure, downsizing of the total length and reduction of sensitivity of respective lens blocks to manufacturing error can be balanced in an excellent condition. If the image pickup lens is tried to be constructed as a three-block structure, it leads to downsizing of the total length but burden of power on each lens becomes large, which increase the sensitivity to manufacturing error. On the other hand, if the image pickup lens is tried to be constructed as a five or more block structure, its power can be shared by respective lenses and the sensitivity to manufacturing error can be reduced. However, the total length becomes large.

It is preferable that the fourth lens block has negative power in the image pickup lens as a four-block structure. When the lens block arranged at the closest position to an image pickup element has negative power, the back focal length can be elongated with its effect to a spherical aberration being minimized. When a negative power is arranged close to an image pickup element, it can make the height of a paraxial ray low. Further, it does not affect the power of the total system and the spherical aberration but Petzval sum can be reduced.

It is preferable that the following conditional expression (6) is satisfied.

$$(D1a+D2a+D3a)/f<0.35 \quad (6)$$

In the expression, D1a is a distance along an optical axis between the first lens block and the second lens block, D2a is a distance along the optical axis between the second lens block and the third lens block, D3a is a distance along the optical axis between the third lens block and the fourth lens block, and f is a composite focal length of the total system.

When the conditional expression (6) is satisfied, the content amount of gas existing between lenses can be reduced, which can reduce the rise of atmospheric pressure caused by expansion of the gas, even when the surrounding temperature rises and can reduce the risk of damage.

It is more preferable that the following conditional expression (6a) is satisfied.

$$(D1a+D2a+D3a)/f<0.30 \quad (6a)$$

The conditional expression (6a) defines more preferable conditional range based on the above view points, out of the conditional range defined by the conditional expression (6). When the conditional expression (6a) is satisfied, the content amount of gas existing between lenses can be furthermore reduced, which can furthermore reduce the rise of atmospheric pressure caused by expansion of the gas even when the surrounding temperature rises and can furthermore reduce the risk of damage.

It is preferable that all of the lens substrates are parallel flat plates having the same thickness. When all of the lens substrates are parallel flat plates having the same thickness, processing and assembling become easy. Because all the lens substrates have no power at the boundary between them and the lens portions, affection of a surface accuracy to the focal point position on the image plane can be reduced.

It is preferable that each of the lens subs aces is formed of a glass material. Glass has a higher softening temperature than that of resin. Therefore, when lens substrates are formed of glass, they are not deteriorated easily even when a reflow processing is performed, and the cost can be reduced. It is more preferable that lens substrates are formed of glass with high softening temperature. When the material employed for the lens substrate is glass, a deterioration of optical properties (such as birefringence inside a lens) caused by a strain caused inside a lens can be reduced better than resin.

It is preferable that each of the lens portions is formed of a resin material. As a material employed for the lens portions, a resin material is more excellent in terms of a property of processing and molding than a glass material and the cost can be reduced.

It is preferable that the resin material is an energy-curable resin material. When the lens portions are formed of energy-curable resin material, the large number of lens portions can be formed by being hardened on a wafer-shaped lens substrate with a mold at the same time. Accordingly, it can enhance a mass-productivity. An energy-curable resin material in this description means a material such as a resin material hardened by heat, and a resin material hardened by light Various means so as to provide energy such as heat and light can be used for the hardening process.

It is preferable that UV-curable resin material is used as the energy-curable resin material. When the UV-curable resin material is used, mass-productivity can be enhanced because the hardening time becomes short. Further, curable resins with excellent heat resistance have been recently developed. When a resin material with heat resistance is employed, it can cope with a camera module which stands for a reflow processing and more inexpensive camera module can be provided. The reflow processing in this description, means a processing that solder as a paste is printed on a printed board (circuit board), heat is added to the printed board to melt the solder after components (camera module) are put on it, and external terminals of sensors are welded to the circuit board automatically.

It is preferable that inorganic particles having a size of 30 nanometers or less are dispersed in the resin material. When inorganic particles having a size of 30 nanometers or less are dispersed in a lens portion formed of a resin material, deterioration of performance and fluctuation of image point position can be reduced even when a temperature changes. Further, there can be obtained an image pickup lens having excellent optical properties despite of environmental change without lowering of light transmittance. In general, if fine particles are mixed in a transparent resin material, light scatters therein and it causes lowered transmittance. Therefore, it has been difficult to use such a material as an optical material. However, by making a size of microparticles to be smaller than a wavelength of a transmitting light flux, occurrence of light scattering can be prevented substantially.

Further, though it has been a drawback of resin material that its refractive index is lower than that of glass material, it has found that the refractive index can be made to be high, by dispersing inorganic particles having high refractive index in a resin material representing base material. Specifically, it is possible to offer a material having an arbitral refractive index, by dispersing inorganic particles of a size of 30 nanometer or less, preferably of 20 nanometer or less, more preferably 15 nanometer or less, into a resin material serving as a base material.

The refractive index of a resin material is lowered if a temperature rises. However, it has been known that, when there are prepared inorganic particles whose refractive index rises if a temperature rises, and when the inorganic particles are dispersed in the resin material serving as a base material, properties of both parties act on each other to cancel, thus, fluctuations of refractive index for temperature changes can be made small. Further, on the contrary, it has also been known that, when there are prepared inorganic particles whose refractive index declines if a temperature rises, and when the inorganic particles are dispersed in the resin material serving as a base material, fluctuations of refractive index for temperature changes can be made to be large. Specifically, it is possible to offer materials having arbitral temperature-dependency, by dispersing inorganic particles of a particle size of 30 nanometer or less, preferably 20 nanometer or less, more preferably 15 nanometer or less, into a resin material serving as a base material. For example, when inorganic particles such as aluminum oxide ($Al_2O_3$) and lithium niobate ($LiNbO_3$) are dispersed in an acrylic resin, it is possible to obtain a resin material having high refractive index and to make fluctuations of changes in refractive index for temperature changes to be small.

Next, refractive index change A due to temperature will be explained in detail as follows. The refractive index change A due to temperature is expressed by the following expression (FA) by differentiating a refractive index "n" with respect to temperature "t", based on Lorentz-Lorenz equation.

$$A = \frac{(n^2+2)(n^2-1)}{6n}\left\{(-3\alpha) + \frac{1}{[R]}\frac{\partial[R]}{\partial t}\right\} \quad \text{(FA)}$$

In the expression (FA), $\alpha$ represents the coefficient of linear expansion, and $[R]$ represents molecular refraction.

In the case of resin materials, a contribution of the second term to the refractive index change is generally smaller than that of the first term in the expression (FA), and it can be mostly neglected. For example, in the case of PMMA (polymethyl methacrylate) resins, coefficient of linear expansion $\alpha$ is $7\times10^{-5}$. When it is substituted in the aforesaid expression (FA), $dn/dt=-1.2\times10^{31\ 4}$ [/° C.] holds to almost agree with actual measurements.

In this case, by dispersing fine particles, which are preferably inorganic materials, in a resin material, the contribution of the second term in the aforesaid expression (FA) is made to be substantially large so that it may offset with a change by linear expansion of the first term each other. Specifically, it is desirable that the change which has been about $-1.2\times10^{-4}$ is controlled to be less than $8\times10^{-5}$ in an absolute value. It is further possible to exhibit a temperature dependency which is opposite to that of a resin material representing a base material, by further increasing the contribution of the second term. In other words, it is also possible to obtain a raw material whose refractive index is raised rather than declined when temperature rises. A mixing ratio of the particles can be varied properly for controlling a change rate of a reflective index for temperature, and it is also possible to disperse inorganic particles such that plural types of particles in nano-sizes are blended.

It is preferable that, in an image pickup lens, the lens blocks are manufactured by a manufacturing process comprising: a step of sealing an area between the lens substrates with a spacer member formed in a grid shape; and a step of cutting the lens substrates and the spacer member which have been joined together, along a framework of a grid of the spacer member. For example, an image pickup lens in which all the lenses are formed by lens blocks, can be easily manufactured by a manufacturing method for manufacturing plural image pickup lenses for forming an image of a subject and plural image pickup apparatuses including the image pickup lenses, comprising a step of sealing an area between the lens substrates with a spacer member formed in a grid shape; and a step of cutting the lens substrates and the spacer member which have been joined together, along a framework of a grid of the spacer member. Thereby, inexpensive image pickup lenses can be mass-produced.

As a manufacturing method of manufacturing plural image pickup lenses, for example, a reflow processing or a replica processing is employed. As for the reflow method, glass having a low softening temperature is deposited through a CVD (Chemical Vapor Deposition) method, the resulting glass is processed through lithography and through dry etching, and the glass-reflow processing is carried out by using a heat processing. Thereby, a large number of lenses are manufactured simultaneously on a glass substrate. As for the replica method, a large number of lenses are manufactured simultaneously on a glass substrate by transferring a large number of lens shapes simultaneously on a lens wafer with a mold by using a curable resin. A large number of lenses can be formed at the same time with any of the methods, and the cost can be reduced. For example, when there are prepared different lenses manufactured by the above method (two lenses prepared by forming lens portions on a lens substrate and cutting the lens substrate into pieces, and their lens portions are different from each other) and when their flat plate portion are adhered together, it forms a lens block in which the first lens portion, the first parallel flat plate, the second parallel flat plate, and the second lens portion are arranged in this order.

Figure 22:
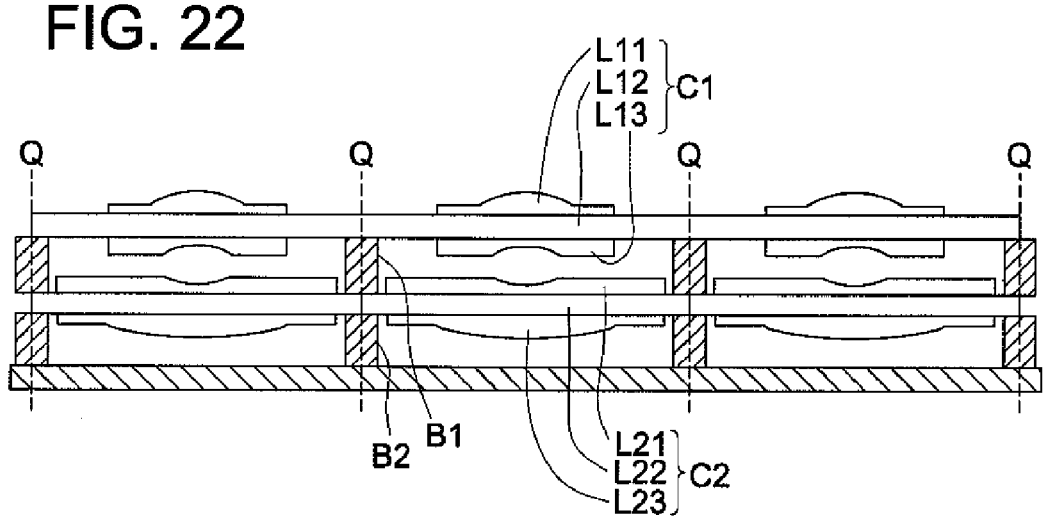
FIG. 22 is a schematic sectional view showing an example of manufacturing steps of an image pickup lens.

FIG. 22 shows an example of manufacturing steps of an image pickup lens by using a schematic sectional view. In the followings, them is given an example of a two-block structure, in order to simplify the description. However, an image pickup lens formed of four or more blocks can be manufactured similarly. First lens block C1 is composed of first lens substrate L12 formed of a parallel flat plate, plural 1a-th lens portions L11 adhered on one plane of it, and plural 1b-th lens portions L13 adhered on the other plane. The first lens substrate L12 may be composed of a single parallel flat plate, or may be composed of two parallel flat plates joined together as described above. Second lens block C2 is composed of second lens substrate L22 formed of a parallel flat plate, plural 2a-th lens portions L21 adhered on one plane of it, and plural 2b-th lens portions L23 adhered on the other plane. Similarly to the first lens substrate L12, the second lens substrate L22 may be composed of a single parallel flat plate, or may be composed of two parallel flat plates joined together as described above.

Spacer member B1 in a grid shape lies between the first lens block C1 and the second lens block C2 to keep a distance between them to be constant, and forms a two-tier structure. Lens portions are arranged in holes of the grid. Substrate B2 is a parallel flat plate (which corresponds to parallel flat plate PT in FIG. 21) such as a wafer-level chip-size package for a sensor including a microlens array, and a parallel flat plate such as a sensor cover glass and an infrared blocking filter. When a space between the lens substrates (namely, the first lens substrate L12 and the second lens substrate L22) is sealed with the spacer member B1 on the substrate B2, and when the first and second lens substrates L12 and L22 and the spacer member B1 joined together are cut along the framework of the gird of the spacer member B1 (along the position of the broken lines Q), plural image pickup lenses each formed of two elements can be obtained. As described above, because a body in which plural first and second lens blocks C1 and C2 are assembled is cut into image pickup lenses, it does not require an adjustment of a lens distance and an assembling process for each image pickup lens, which enables mass production. Further, because the spacer member B1 is formed in a grid shape, it can be used for a mark for the cutting process. It is consistent with the object in the present technical art, and contributes to mass production of inexpensive lens systems.

An image pickup lens relating to the present invention is suitable to be used for a digital device with an image inputting function (for example, a mobile terminal). When the image pickup lens is combined with a device such as an image pickup element, it can construct an image pickup apparatus which takes an image of a subject therein in an optical manner and outputs it as electric signal. The image pickup apparatus is an optical device forming an essential construction part of a camera used for shooting a static image or movie of a subject. For example, the image pickup apparatus is composed of, in order from an object (namely, a subject), an image pickup lens for forming an optical image of the subject, and an image pickup element for converting the optical image formed by the image pickup lens into electric signal. By arranging the image pickup lens with the above-described features is arranged so as to form the optical image of the subject on a light-receiving surface of the image pickup element, an image pickup apparatus with high performance and a digital device equipped with the same (for example, a mobile terminal) can be realized at a low cost.

As an example of a camera, a digital camera, a video camera, a security camera, an on vehicle camera and a videophone camera are cited. Further, the camera may also be built in or be attached on a personal computer, a mobile terminal (for example, a compact and portable information equipment terminal such as a cell-phone and a mobile computer), a peripheral of the aforesaid equipment (a scanner and a printer or the like) and other digital equipment. As is understood from these examples, loading of an image pickup apparatus constructs not only a camera but also various types of equipment having functions of a camera. For example, a digital equipment having an image inputting function such as a cell-phone equipped with a camera can be constructed.

Figure 21:
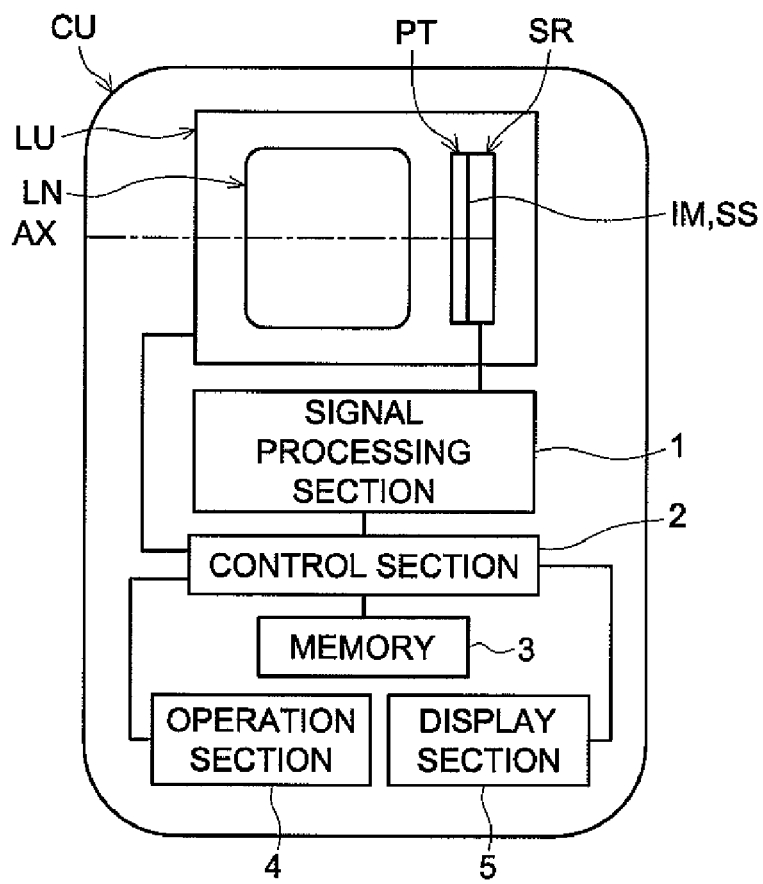
FIG. 21 is a diagram showing an example of a schematic construction of a mobile terminal equipped with an image pickup apparatus, by using a schematic sectional view.

FIG. 21 shows a diagram of an example of a schematic construction of a mobile terminal CU as an example of a digital apparatus with an image inputting function, by using a schematic sectional view. Image pickup apparatus LU mounted in the mobile terminal CU in FIG. 21 includes, in order from the object (namely subject) side, image pickup lens LN for forming optical image (image plane) IM of the object (where AX represents an optical axis), parallel flat plate PT (equivalent to an optical filter arranged depending on the situation, such as an optical low-pass filter and infrared cut filter; and to a cover glass of image pickup element SR), and image sensor SR for converting optical image IM formed on light-receiving surface SS formed by image pickup lens LN into electric signal. When mobile terminal CU having an image inputting function is composed of image pickup apparatus LU of this kind, image pickup apparatus LU is generally arranged in the inside of a body of the mobile terminal CU. For realizing camera functions by mobile terminal CU, image pickup apparatus LU can take a form that is required. For example, unitized image pickup apparatus LU may be mounted on or dismounted from a main body of mobile terminal CU freely, or it may be freely rotatable for a main body of mobile terminal CU.

For example, as image pickup element SR, there are given an image sensor of a CCD type and an image sensor of a CMOS type both having a plurality of pixels thereon. The image pickup lens LN is positioned so that optical image IM of a subject may be formed on light-receiving surface SS of image sensor SR. Therefore, optical image IM formed by the image pickup lens LN is converted efficiently into electric signal.

Mobile terminal CU includes signal processing section 1, control section 2, memory 3, operation section 4 and display section 5, in addition to the image pickup apparatus LU. The signal processing section 1 conducts, for example, prescribed digital image processing and image compression processing, for signal generated by image sensor SR, as occasion demands. Then, the processed signal is recorded in memory 3 (such as semiconductor memory and optical disc) as digital image signal, or is transmitted to the other equipment by passing through cables or being converted into infrared radiation signal. The control section 2 is formed of a microcomputer and intensively carries out a control for image pickup function and image reproducing function, and a control of a lens drive mechanism for a focusing operation. For example, the control section 2 controls image pickup apparatus LU so that at least one of shooting still images of a subject and shooting video of a subject may be carried out. The display section 5 is a portion including a display such as a liquid crystal monitor, and it displays images by using image signal converted by image sensor SR or by using image information recorded in memory 3. The operation section 4 is a portion including operating members such as an operation button (for example, a release button) and an operation dial (for example, a shooting mode dial), and it transmits information operated and inputted by an operator to the control section 2.

Image pickup lens LN includes four or more lens blocks as described below, and has a structure to form optical image IM on light-receiving surface SS of image pickup element SR. An optical image to be formed by the image pickup lens LN passes through, for example, an optical low-pass filter (corresponding to parallel flat plate PT in FIG. 21) having a predetermined cut-off frequency characteristic determined by a pixel pitch of image pickup element SR. Its spatial frequency characteristic is adjusted so that a so-called folding noise generated when an image is converted into electric signal may be minimized to after this passage. Thereby, occurrence of color moiré can be controlled. However, if a performance at a frequency around the resolution limit has been controlled, noises are not generated even when an optical low-pass filter is not used. Further, when a user takes or views a photograph by using a display system having a less noise (for example, a liquid crystal screen of a cell-phone), no optical low-pass filter is needed.

As for focusing operation of image pickup lens LN, the whole of lens unit may be moved in the direction of optical axis AX with an actuator, or a part of lenses may be moved in the direction of optical axis AX. For example, when the focusing operation is carried out by using only the first lens block C1, the actuator can be downsized. Further, the focusing function may be realized by carrying out the processing to make the depth of focus deeper with software by using information recorded on image pickup element SR, rather than by moving the lens in the direction of the optical axis for the focusing operation. In that case, the actuator is not required, which realizes downsizing and saving cost at the same time.

Next, a specific optical structure of image pickup lens LN will be described with giving the first to tenth embodiments. FIGS. 1 to 10 show lens structures of the first to tenth embodiments as optical sectional diagrams, respectively. Image pickup lens LN of each embodiment is a single-focus lens for shooting (for example, for a mobile terminal) to form optical image IM for image pickup element SR, as shown in FIG. 21. In the first to tenth embodiments, image pickup lens LN is composed of four lens blocks including, in order from the object side, first lens block C1, second lens block C2, third lens block C3, and fourth lens block C4.

In the first to tenth embodiments, lens blocks C1 to C4 are formed as follows, in order from the object side. In the first lens block C1, lath lens portion L11, first lens substrate L12, and 1b-th lens portion L13 are arranged in this order. In the second lens block C2, 2a-th lens portion L21, second lens substrate L22, and 2b-th lens portion L23 are arranged in this order. In the third lens block C3, lens 3a-th section L31, third lens substrate L32, and 3b-th lens portion L33 are arranged in this order. In the fourth lens block C4, 4a-th lens portion L41, fourth lens substrate L42, and 4b-th lens portion L43 are arranged in this order. When an i-th (where i=1, 2, 3, and 4) positioned lens block from the object side to the image side is assumed to be i-th lens block Ci, the ia-th lens block Li1 and the i-th lens substrate Li2 have different refractive indexes, and the i-th lens substrate Li2 and the ib-th lens block Li3 have different refractive indexes.

In the first, second, fourth, sixth, and seventh embodiments, the power arrangement of lens blocks C1 to C4 is in order of positive, negative, positive, and negative. In the third, fifth, ninth, and tenth embodiments, the power arrangement of lens blocks C1 to C4 is in order of positive, negative, positive, and positive. In the eighth embodiment, the power arrangement of lens blocks C1 to C4 is in order of positive, negative, negative, and positive. In each embodiment, a power arrangement of positive and negative is positioned at the most closest position to the object side. Therefore, the above-described effect to correct aberrations can be obtained. In the first, second, fourth, sixth, and seventh embodiments, the fourth lens block C4 which is at the closest position to the image side has negative power, which reduces influence to the spherical aberration as described above as much as possible and elongates the back focal length.

In the first to tenth embodiments, the fourth lens block C4 has a concave shape facing the image side. In other words, the image-side surface of 4b-th lens portion L43 has a concave shape in the paraxial region. Thereby, an effect that the back focal length is easily secured is obtained as described above. Further, the image-side surface of 4b-th lens portions L43, which is the rearmost lens surface, includes an inflection point in the lens periphery. Thereby, the surface has a divergent action for rays around the paraxial region, and also has a convergent action for off-axis rays to be formed on the periphery of the image pickup element. Thereby, telecentricity can be enhanced in the periphery of the image area with a sufficient back focal length being secured.

In the second, third, sixth to eighth, and tenth embodiments, the second lens block C2 has a convex shape facing the image side in the paraxial region. In other words, the image-side surface of 2b-th lens portion L23 has a convex shape in the paraxial region. Thereby, a deterioration of performance can be reduced as described above, even when the first and second blocks C1 and C2 are decentered. Because the second lens block C2 in these embodiments has a meniscus shape, the effect to be obtained becomes greater.

In the first to third and fifth to tenth embodiments, the third lens block C3 has a concave shape facing the image side in the paraxial region. In other words, the image-side surface of 3b-th lens portion L33 has a concave shape in the paraxial region. Thereby, an effect that the back focal length can be easily maintained can be obtained as described above. Because the image-side surface of 3b-th lens portion L33 includes an inflection point, an effect to reduce a generation of various aberrations as described above is also obtained.

In the first, second, fourth to eighth embodiments, there is arranged aperture stop ST on the object-side surface of the first lens substrate L12 forming the first lens block C1. In the third embodiment, there is arranged aperture stop ST on the image-side surface of the first lens substrate L12 forming the first lens block C1. In the ninth embodiment, there is arranged aperture stop ST at the closest position to the object in image pickup lens LN. In the tenth embodiment, there is arranged aperture stop ST between the first lens block C1 and the second lens block C2. In each embodiment, the position of the stop is set at the closer position to the object side than the second lens block C2, which enhances the telecentricity as described above. Further, opening aperture ST on a surface of first lens substrate L12 is effective for eliminating unwanted light.

EXAMPLES

Hereinafter; structures of image pickup lenses in which the present invention is carried out, will be described specifically with construction data of examples. Examples 1 to 10 which will be provided later are numerical examples corresponding to the above-described first to tenth embodiments, respectively. The optical construction diagrams (FIGS. 1 to 10) representing the first to the tenth embodiments show lens constructions of Example 1 to 10, respectively.

In the construction data of each example, there are shown as SURFACE DATA, in order from the column at the left hand side, the surface number, curvature radius "r" (mm), surface distance along the axis "d" (mm), refractive index for d-line "nd", and Abbe number for d-line "vd". The surface represented by the surface number followed by an asterisk "*" is an aspheric surface, and its surface shape is defined by the following expression (AS) using a local Cartesian coordinate system whose origin is located at the surface vertex. There are further shown aspheric surface coefficients as ASPHERIC SURFACE DATA. In ASPHERIC SURFACE DATA of each example, a coefficient that is not written has the value of zero, and "e±n" means "×10$^{±n}$" for all the data $$Z = (c \cdot h^2)/[1 + \sqrt{\{1-(1+K) \cdot c^2 \cdot h^2\}}] + \Sigma(Aj \cdot h^j) \quad \text{(AS)}$$

In the expression, h is a height ($h^2 = x^2 + y^2$) in the perpendicular direction to the z-axis (optical axis AX), z is a sag amount along optical axis AX at the height h (measured from the surface vertex), c is a curvature radius at the surface vertex (the inverse of curvature radius r), K is a conic constant, and Aj is a j-th order aspheric coefficient.

As VARIOUS DATA, there are shown focal length (f, mm), F-number (Fno.), half angle of view (ω, °), image height (y'max, mm), total lens length (TL, m), and back focal length (BF, m). Each of the F-number, half angle of view and back focal length is represented as an effective value for the total lens length and the object distance (∞). The back focal length represents the distance from the rearmost lens surface to the paraxial image plane in terms of the air-equivalent length. The total lens length is obtained by adding the back focal length to the distance from the forefront lens surface to the rearmost lens surface.

As LENS BLOCK DATA, there are shown focal lengths of respective lens blocks. Further, Table 1 shows values of the examples, corresponding to the respective conditional expressions. In Table 1, the values corresponding to the conditional expression (1) are represented with Vi1, Vi2, and Vi3 which are Abbe numbers of ia-th lens portion Li1, i-th lens substrate Li2, and ib-th lens portion Li3 of the i-th lens block Ci, respectively, and the values corresponding to the conditional expression (2) are represented with ri1 and ri2 which are the values for the object-side surface and the image-side surface of the i-th lens block Ci.

FIGS. 11 to 20 are aberration diagrams of Example 1 to 10. In FIGS. 11 to 20, there are provided a spherical aberration diagram (LONGITUDINAL SPHERICAL ABER), an astigmatism diagram (ASTIGMATIC FIELD CURVATURES), and a distortion diagram (DISTORTION), in order from the left hand side. The spherical aberration diagrams show a spherical aberration amount for d-line (wavelength: 587.56 nm) represented by a solid line, a spherical aberration amount for C-line (wavelength: 656.28 nm) represented by a shorter dashed line, and a spherical aberration amount for g-line (wavelength: 435.84 nm) represented by a longer dashed line, in terms of a displacement amount from the paraxial image plane in the direction of optical axis AX (unit mm, scale of the horizontal axis: from −0.200 mm to 0.200 mm), and the vertical axis represents a value obtained by normalizing an incident height to the pupil by its maximum height (in other words, a relative height to the pupil). In the astigmatism diagram, dashed line T or Y represents the tangential image plane for d-line and sold line S or X represents the sagittal image plane for d-line, in terms of a displacement amount from the paraxial image plane in the direction of optical axis AX (unit: mm, scale of the horizontal axis: from −0.20 mm to 0.20 mm), and the vertical axis represents the image height (IMG HT, unit: mm). In the distortion diagrams, the horizontal axis represents a distortion for d-line (unit: %, scale of the horizontal axis: from −5.0% to 5.0%), and the vertical axis represents the image height (IMG HT, unit: mm). Image height IMG HT is equivalent to the maximum image height y'max on the image-forming surface (the half of the diagonal length of light-receiving surface SS of image pickup element SR).

Image pickup lens LN of Example 1 (FIG. 1) is composed of, in order from the object side, first lens block C1 composed of 1a-th lens portion L11 which is convex toward the object side, aperture stop ST, first lens substrate L12, the 1b-th lens portion L13 which is concave toward the image side; second lens block C2 composed of 2a-th lens portion L21 which is concave toward the object side, second lens substrate L22, and 2b-th lens portion L23 which is convex toward the image side; third lens block C3 composed of 3a-th lens portion L31 which is convex toward the object side, third lens substrate L32, and 3b-th lens portion L33 which is concave toward the image side; and fourth lens block C4 composed of 4a-th lens portion L41 which is convex toward the object side, fourth lens substrate L42, and 4b-th lens portion L43 which is concave toward the image side. All the surfaces in contact with the air in the lens portions are surfaces in an aspheric shape. Each of the surfaces in contact with the air in the lens portions of the third lens block C3 and the fourth lens block C4 includes an inflection point.

Image pickup lens LN of Example 2 (FIG. 2) is composed of, in order from the object side, first lens block C1 composed of 1a-th lens portion L11 which is convex toward the object side, aperture stop ST, first lens substrate L12, and 1b-th lens portion L13 which is concave toward the image side; second lens block C2 composed of 2a-th lens portion L21 which is concave toward the object side, second lens substrate L22, and 2b-th lens portion L23 which is convex toward the image side; third lens block C3 composed of 3a-th lens portion L31 which is convex toward the object side, third lens substrate L32, and 3b-th lens portion L33 which is concave toward the image side; and fourth lens block C4 composed of 4a-th lens portion L41 which is convex toward the object side, fourth lens substrate L42, and 4b-th lens portion L43 which is concave toward the image side. All the surfaces in contact with the air in the lens portions are surfaces in an aspheric shape. Each of the surfaces in contact with the air in the lens portions of the third lens block C3 and the fourth lens block C4 includes an inflection point.

Image pickup lens LN of Example 3 (FIG. 3) is composed of in order from the object side, first lens block C1 composed of 1a-th lens portion L11 which is convex toward the object side, aperture stop ST, first lens substrate L12, and 1b-th lens portion L13 which is convex toward the image side; second lens block C2 composed of 2a-th lens portion L21 which is concave toward the object side, second lens substrate L22, and 2b-th lens portion L23 which is convex toward the image side; third lens block C3 composed of 3a-th lens portion L31 which is convex toward the object side, third lens substrate L32, and 3b-th lens portion L33 which is concave toward the image side; and fourth lens block C4 composed of 4a-th lens portion L41 which is convex toward the object side, fourth lens substrate L42, and 4b-th lens portion L43 which is concave toward the image side. All the surfaces in contact with the air in the lens portions are surfaces in an aspheric shape. Each of the surfaces in contact with the air in the lens portions of the third lens block C3 and the fourth lens block C4 includes an inflection point.

Image pickup lens LN of Example 4 (FIG. 4) is composed of, in order from the object side, first lens block C1 composed of 1a-th lens portion L11 which is convex toward the object side, aperture stop ST, first lens substrate L12, and 1b-th lens portion L13 which is concave toward the image side; second lens block C2 composed of 2a-th lens portion L21 which is concave toward the object side, second lens substrate L22, and 2b-th lens portion L23 which is concave toward the image side; third lens block C3 composed of 3a-th lens portion L31 which is convex toward the object side, third lens substrate L32, and 3b-th lens portion L33 which is convex toward the image side; and fourth lens block C4 composed of 4a-th lens portion L41 which is concave toward the object side, fourth lens substrate L42, and 4b-th lens portion L43 which is concave toward the image side. All the surfaces in contact with the air in the lens portions are surfaces in an aspheric shape.

The surface in contact with the air of the lens portion L41 at the object side in the fourth lens block C4 includes an inflection point.

Image pickup lens LN of Example 5 (FIG. 5) is composed of, in order from the object side, first lens block C1 composed of 1a-th lens portion L11 which is convex toward the object side, aperture stop ST, first lens substrate L12, and 1b-th lens portion L13 which is concave toward the image side; second lens block C2 composed of 2a-th lens portion L21 which is concave toward the object side and second lens substrate L22; third lens block C3 composed of 3a-th lens portion L31 which is convex toward the object side, third lens substrate L32, and 3b-th lens portion L43 which is concave toward the image side; and fourth lens block C4 composed of 4a-th lens portion L41 which is convex toward the object side, fourth lens substrate L42, and 4b-th lens portion L43 which is concave toward the image side. All the surfaces in contact with the air in the lens portions are surfaces in an aspheric shape. Each of the surfaces in contact with the air in the lens portions of the third lens block C3 and the fourth lens block C4 includes inflection point.

Image pickup lens LN of Example 6 (FIG. 6) is composed of in order from the object side, first lens block C1 composed of 1a-th lens portion L11 which is convex toward the object side, aperture stop ST, first lens substrate L12, and 1b-th lens portion L13 which is concave toward the image side; second lens block C2 composed of 2a-th lens portion L21 which is concave toward the object side, second lens substrate L22, and 2b-th lens portion L23 which is convex toward the image side; third lens block C3 composed of 3a-th lens portion L31 which is convex toward the object side, third lens substrate L32, and 3b-th lens portion L33 which is concave toward the image side; and fourth lens block C4 composed of 4a-th lens portion L41 which is convex toward the object side, fourth lens substrate L42, and 4b-th lens portion L43 which is concave toward the image side. All the surfaces in contact with the air in the lens portions are surfaces in an aspheric shape. Each of the surfaces in contact with the air in the lens portions of the third lens block C3 and the fourth lens block C4 includes an inflection point.

Image pickup lens LN of Example 7 (FIG. 7) is composed of in order from the object side, first lens block C1 composed of 1a-th lens portion L11 which is convex toward the object side, aperture stop ST, first lens substrate L12, and 1b-th lens portion L13 which is concave toward the image side; second lens block C2 composed of 2a-th lens portion L21 which is concave toward the object side, second lens substrate L22, and 2b-th lens portion 123 which is convex toward the image side; third lens block C3 composed of 3a-th lens portion L31 which is convex toward the object side, third lens substrate L32, and 3b-th lens portion L33 which is concave toward the image side; and fourth lens block C4 composed of 4a-th lens portion L41 which is convex toward the object side, fourth lens substrate L42, and 4b-th lens portion L43 which is concave toward the image side. All the surfaces in contact with the air in the lens portions are surfaces in an aspheric shape. Each of the surfaces in contact with the air in the lens portions of the third lens block C3 and the fourth lens block C4 includes an inflection point.

Image pickup lens LN of Example 8 (FIG. 8) is composed 4 in order from the object side, first lens block C1 composed of 1a-th lens portion L11 which is convex toward the object side, aperture stop ST, first lens substrate L12, and 1b-th lens portion L13 which is concave toward the image side; second lens block C2 composed of 2a-th lens portion L21 which is concave toward the object side, second lens substrate L22, and 2b-th lens portion L23 which is convex toward the image side; third lens block C3 composed of 3a-th lens portion L31 which is convex toward the object side, third lens substrate L32, and 3b-th lens portion L23 which is concave toward the image side; and fourth lens block C4 composed of 4a-th lens portion L21 which is convex toward the object side, fourth lens substrate L42, and 4b-th lens portion L43 which is concave toward the image side. All the surfaces in contact with the air in the lens portions are surfaces in an aspheric shape. Each of the surfaces in contact with the air in the lens portions of the third lens block C3 and the fourth lens block C4 includes an inflection point.

Image pickup lens LN of Example 9 (FIG. 9) is composed of, in order from the object side, aperture stop ST, first lens block C1 composed of lath lens portion L11 which is convex toward the object side, first lens substrate L12, and 1b-th lens portion L13 which is concave toward the image side; second lens block C2 composed of 2a-th lens portion L21 which is concave toward the object side, second lens substrate L22, and 2b-th lens portion 123 which is convex toward the image side; third lens block C3 composed of 3a-th lens portion L31 which is convex toward the object side, third lens substrate L32, and 3b-th lens portion L33 which is concave toward the image side; and fourth lens block C4 composed of 4a-th lens portion L41 which is convex toward the object side, fourth lens substrate L42, and 4b-th lens portion L43 which is concave toward the image side. All the surfaces in contact with the air in the lens portions are surfaces in an aspheric shape. Each of the surface in contact with the air in the lens portion at the image side in the first lens block C1 and the surfaces in contact with the air in the lens portions of the third lens block C3 and the fourth lens block C4 includes an inflection point.

Image pickup lens LN of Example 10 (FIG. 10) is composed of in order from the object side, first lens block C1 composed of 1a-th lens portion L11 which is convex toward the object side, first lens substrate L12, and 1b-th lens portion L13 which is convex toward the image side; aperture stop ST; second lens block C2 composed of 2a-th lens portion L21 which is concave toward the object side, second lens substrate L22, and 2b-th lens portion L23 which is convex toward the image side; third lens block C3 composed of 3a-th lens portion L31 which is convex toward the object side, third lens substrate L32, and 3b-th lens portion L33 which is concave toward the image side; and fourth lens block C4 composed of 4a-th lens portion L41 which is convex toward the object side, fourth lens substrate L42, and 4b-th lens portion L43 which is concave toward the image side. All the surfaces in contact with the air in the lens portions have surfaces in an aspheric shape. Each of the surface in contact with the air in the lens portion at the image side in the first lens block C1 and the surfaces in contact with the air in the lens portions of the third lens block C3 and the fourth lens block C4 includes an inflection point.

Construction data of Examples 1 to 10 are shown together in the followings.

EXAMPLE 1

Unit: mm
Surface Data
Surface number rd nd vd
Object plane ∞∞
1*1.789 0.300 1.52000 57.00
2(Stop)∞0.300 1.47400 56.40
3∞0.050 1.55000 32.00
4*18.611 0.812
5*−2.890 0.050 1.55000 32.00
6∞0.300 1.47400 56.40

7 ∞ 0.258 1.52000 57.00
8* 14.908 0.101
9* 1.586 0.298 1.52000 57.00
10 ∞ 0.484 1.47400 56.40
11 ∞ 0.148 1.52000 57.00
12* 3.508 0221
13* 1.899 0.143 1.52000 57.00
14 ∞ 0.484 1.47400 56.40
15 ∞ 0.050 1.52000 57.00
16* 1.305 0.400
17 ∞ 0.300 1.51600 64.10
18 ∞ 0.069
Image Plane ∞
Aspheric Surface Data
First Surface
K=−4.75326e−001
A4=1.20011e−002
A6=−1.29249e−002
A8=2.25485e−002
A10=−1.31516e−002
A12=0.000006e+000
Fourth Surface
K=1.86879e+001
A4=7.39764e−004
A6=−3.18254e−003
A8=−2.87821e−003
A10=−139821e−003
A12=0.00000e+000
Fifth Surface
K=2.77578e+000
A4=−2.94996e−002
A6=1.56654e−002
A8=−2.26424e−002
A10=1.68279e−002
A12=0.00000e+000
Eighth Surface
K=1.25613e+001
A4=−3.46061e−001
A6=2.46884e−001
A8=−9.79167e−002
A18.01517e−003
A12=8.12622e−003
Ninth Surface
K=−6.12637e+000
A4=−1.14884e−001
A6=4.52160e−002
A8=−2.50140e−002
A10=4.61900e−003
A12=−9.12034e−004
Twelfth Surface
K=−120730e+000
A4=−7.58501e−003
A6=−2.93498e−002
A8=7.55955e−003
A10=6.97942e−004
A12=−4.02481e−004
Thirteenth Surface
K=−1.02760e+001
A4=−1.29413e−001
A6=1.92570e−002
A8=6.90908e−003
A10=−1.30752e−003
A12=−1.46251e−004
Sixteenth Surface
K=−6.22760e+000
A4=−3.44429e−002
A6=−1.44416e−002

A8=7.64246e−003
A10=−1.28320e−003
A12=6.79087e−005
Various Data
f3.654
Fno. 2.060
ω31.125
y'max 2.244
TL 4.667
BF 0.667
Lens Block Data
Block Surface Focal Length
1 1-4 3.776
2 5-8 −4.389
3 9-12 4.767
4 13-16 −13.355

EXAMPLE 2

Unit: mm
Surface Data
Surface number r d nd vd
object plane ∞ ∞
1* 1.444 0.300 1.52000 57.00
2(Stop) ∞ 0.300 1.47400 56.40
3 ∞ 0.050 1.55000 32.00
4* 6.260 0.681
5* −2.460 0.050 1.55000 32.00
6 ∞ 0.300 1.47400 56.40
7 ∞ 0.300 1.52000 57.00
8* −18.452 0.130
9* 1.688 0.242 1.52000 57.00
10 ∞ 0.441 1.47400 56.40
11 ∞ 0.091 1.52000 57.00
12* 2.960 0.228
13* 1.660 0.150 1.52000 57.00
14 ∞ 0.388 1.47400 56.40
15 ∞ 0.050 1.52000 57.00
16* 1.189 0.399
17 ∞ 0.300 1.51600 64.10
18 ∞ 0.073
Image plane ∞
Aspheric Surface Data
First Surface
K=−1.40525e−001
A4=1.61020e−002
A6=4.04094e−003
A8=3.05360e−002
A10=−1.15867e−002
A12=0.00000e+000
Fourth Surface
K=2.87110e+001
A4=9.10195e−003
A6=1.49515e−002
A8=−3.31059e−002
A10=4.95934e−002
A12=0.00000e+000
Fifth Surface
K=5.02919e+000
A4=−4.20090e−002
A6=5.88712e−003
A8=3.07636e−003
A10=1.49479e−002
A12=0.00000e+000
Eighth Surface
K=−1.60826e+000
A4=−3.44334e−001

A6=2.47103e-001
A8=-9.73862e-002
A10=1.09145e-002
A12=1.15465e-002
Ninth Surface
K=-5.34940e+000
A4=-1.29929e-001
A6=4.85058e-002
A8=-2.30448e-002
A10=14.37529e-003
A12=-2.50106e-004
Twelfth Surface
K=4.189400-000
A4=-1.37373e-002
A6=-3.23998e-002
A8=8.71923e-003
A10=8.82042e-004
A12=-5.42462e-004
Thirteenth Surface
K=-9.63265e+000
A4=-1.32449e-001
A6=2.38032e-002
A8=6.49067e-003
A10=-1.64924e-003
A12=-9.10903e-005
Sixteenth Surface
K=-6.35144e+000
A4=-3.24675e-002
A6=-2.00422e-002
A8=8.91345e-003
A10=1.17429e-003
A12=3.48802e-005
Various Data
f 3.515
Fno. 2.470
ω 32.197
y'max 2.244
TL 4.371
BF 0.670
Lens Block Data
Block Surface Focal Length
1 1-4 3.498
2 5-8 -5.191
3 9-12 6.234
4 13-16 -14.264

EXAMPLE 3

Unit: mm
Surface Data
Surface number r d nd vd
Object surface ∞ ∞
1* 1.882 0269 1.52000 57.00
2 ∞ 0.300 1.47400 56.40
3(Stop) ∞ 0.175 1.52000 57.00
4* -12.800 0.569
5* -1.873 0.050 1.55000 32.00
6 ∞ 0.313 1.47400 56.40
7 ∞ 0.255 1.52000 57.00
8* -199.900 0.111
9* 1.560 0.310 1.52000 57.00
10 ∞ 0.383 1.47400 56.40
11 ∞ 0.103 1.52000 57.00
12* 1.799 0.114
13* 0.929 0.248 1.52000 57.00
14 ∞ 0.300 1.47400 56.40
15 ∞ 0.043 1.52000 57.00
16* 1.003 0.516
17 ∞ 0.465 1.51600 64.10
18 ∞ 0.073
Image Plane ∞
Aspheric Surface Data
First Surface
K=-926361e-001
A4=1.06054e-003
A6=-2.63594e-002
A8=2.09461e-002
A10=-3.74790e-002
A12=0.00000e+000
Fourth Surface
K=-1.65977e+001
A4=-3.91174e-002
A6=-5.92188e-002
A8=9.13158e-003
A10=-5.66821 e-003
A12=0.00000e+000
Fifth Surface
K=7.63530e-001
A4=-2.82677e-002
A6=-3.05181e-004
A8=-4.35936e-002
A10=7.92393e-002
A12=0.00000e+000
Eighth Surface
K=2.80301e+003
A4=-3.47339e-001
A6=2.58863e-001
A8=-9.81298e-002
A10=8.36197e-003
A12=1.34104e-002
Ninth Surface
K=3.78246e+000
A4=-1.29333e-001
A6=5.54948e-002
A8=-2.90945e-002
A10=2.11440e-003
A12=1.60054e-004
Twelfth Surface
K=-1.70477e+001
A4=2.43639e-002
A6=-336307e-002
A8=3.94851e-003
A10=4.60838e-004
A12=-5.97090e-005
Thirteenth Surface
K=-4.54783e+000
A4=-1.52680e-001
A6=1.53960e-002
A8=6.86323e-003
A10=-8.00463e-004
A12=-1.48550e-004
Sixteenth Surface
K=4.76306e+000
A4=-5.05500e-002
A6=2.44787e-002
A8=1.10948e-002
A10=-1.23611e-003
A12=2.82574e-006
Various Data
f 3.384
Fno. 2.060
ω 33.330
y' max 2.244
TL 4.440

BF 0.895
Lens Block Data
Block Surface Focal Length
1 1-4 3.212
2 5-8 −3.439
3 9-12 10.472
4 13-16 6.402

EXAMPLE 4

Unit: mm
Surface Data
Surface number r d nd vd
Object surface ∞∞
1*1.626 0.248 1.52000 57.00
2(Stop)∞0.400 1.47400 56.40
3∞0.111 1.52000 57.00
4*−9.387 0.117
5*26.887 0.051 1.52000 57.00
6∞0.400 1.47400 56.40
7∞0.078 1.63000 24.00
8*2.237 0.364
9*154.758 0.051 1.52000 57.00
10∞0.400 1.47400 56.40
11∞0.300 1.52000 57.00
12*−1.757 0.480
13*−9.866 0.063 1.52000 57.00
14∞0.400 1.47400 56.40
15∞0.161 1.52000 57.00
16*1.862 0.400
17∞0.300 1.51633 64.14
18∞0.096
Image Plane ∞
Aspheric Surface Data
First Surface
K=−1.52692e−001
A4=−8.35933e−003
A6=1.87627e−002
A8=−3.15654e−002
A10=0.00000e+000
A12=0.00000e+000
Fourth Surface
K=−2.69077e+001
A4=3.83769e−002
A6=−7.60393e−003
A8=−1.46442e−002
A10=0.00000e+000
A12=0.00000e+000
Fifth Surface
K=−3.00000e+001
A4=−9.46707e−002
A6=−2.99656e−002
A8=7.02903e−002
A12=0.00000e+000
Eighth Surface
K=7.71871e−002
A4=−4.30880e−002
A6=1.39855e−002
A8=−2.10002e−002
A10=4.03360e−002
A12=0.00000e+000
Ninth Surface
K=3.00000e+001
A4=4.40707e−005
A6=−1.49922e−002
A8=1.51644e−002
A10=−2.29754e−002

A12=0.00000e+000
Twelfth Surface
K=−8.26796e+000
A4=−9.74831e−002
A6=8.10669e−002
A8=−1.89838e−003
A10=3.74246e−003
A12=−4.35185e−003
Thirteenth Surface
K=2.87169e+001
A4=−1.34291e−001
A6=4.33820e−002
A8=2.26107e−002
A10=−1.20573e−002
A12=1.56751e−003
Sixteenth Surface
K=−721907e+000
A4=−8.99635e−002
A6=3.41522e−002
A8=−1.24440e−002
A10=2.57011e−003
A12=−2.03166e−004
Various Data
f3.667
Fno. 2.470
ω30.863
y'max 2.244
TL 4.317
BF 0.694
Lens Block Data
Block Surface Focal Length
1 1-4 2.731
2 5-8 −3.842
3 9-12 3.346
4 13-16 −2.958

EXAMPLE 5

Unit: mm
Surface Data
Surface number r d nd vd
Object plane ∞∞
1*1.412 0300 1.52000 57.00
2(Stop)∞0.385 1.47400 56.40
3∞0.285 1.55000 32.00
4*5.607 0.548
5*−2.499 0.050 1.55000 32.00
6∞0.300 1.47400 56.40
7∞0.100
8*2.302 0.291 1.52000 57.00
9∞0.300 1.47400 56.40
10∞0.059 1.52000 57.00
11*3.296 0.273
12*1.957 0.300 1.52000 57.00
13∞0.500 1.47400 56.40
14∞0.081 1.52000 57.00
15*1.837 0.371
16∞0.369 1.51600 64.10
17∞0.070
Image plane ∞
Aspheric Surface Data
First Surface
K=−2.27747e−001
A4=5.84302e−003
A6=3.02365e−002
A8=−3.17392e−002
A10=2.18523e−002

A12=0.00000e+000
Fourth Surface
K=2.52211e+001
A4=1.61699e−002
A6=−5.07108e−002
A8=9.41184e−002
A10=−1.04400e−001
A12=0.00000e+000
Fifth Surface
K=6.65378e+000
A4=6.63051e−002
A6=2.47045e−002
A8=−1.25025e−001
A10=6.98031e−002
A12=0.00000e+000
Eighth Surface
K=−1.31238e+000
A4=−7.39376e−002
A6=2.54659e−002
A8=4.49728e−002
A10=8.07536e−003
A12=−2.97025e−003
Eleventh Surface
K=−3.40141e+001
A4=−3.10958e−002
A6=−6.00860e−003
A8=4.67715e−003
A10=1.07136e−004
A12=−3.51326e−004
Twelfth Surface
K=−3.749920−000
A4=−1.44565e−001
A6=1.90908e−002
A8=7.39784e−003
A10=−1.48746e−003
A12=−1.02123e−006
Fifteenth Surface
K=−5.67542e+000
A4=−2.84325e−002
A6=1.28707e−002
A8=6.20385e−003
A10=−1.15838e−003
A12=8.09209e−005
Various Data
f 3.792
Fno. 2.470
ω 30.203
y'max 2.244
TL 4.456
BF 0.684
Lens Block Data
Block Surface Focal Length
1 1-4 3.410
2 5-7 −4.543
3 8-11 11.959
4 12-15 36.993

EXAMPLE 6

Unit: mm
Surface Data
Surface number r d nd vd
Object plane ∞∞
1*1.628 0.283 1.59325 61.81
2(Stop)∞0.422 1.75520 27.58
3∞0.100 1.60083 38.55
4*8.838 0.636
5*−2.722 0.050 1.75520 27.58
6∞0.300 1.53888 65.53
7∞0.300 1.64608 55.72
8*−16.892 0.120
9*1.750 0.181 1.57706 41.91
10∞0.340 1.51173 58.31
11∞0.161 1.49528 69.55
12*3.151 0266
13*1.904 0.131 1.66173 43.55
14∞0.361 1.60775 37.71
15∞0.100 1.72532 33.60
16*1.402 0.349
17∞0.300 1.51600 64.10
18∞0.100
Image Plane ∞
Aspheric Surface Data
First Surface
K=−4.67355e−001
A4=1.15537e−002
A6=−8.69132e−003
A8=1.96242e−002
A10=−2.28004e−002
A12=0.00000e+000
Fourth Surface
K=5.53072e+000
A4=−1.58919e−002
A6=−2.72905e−002
A8=8.62561e−003
A10=−3.54272e−002
A12=0.00000e+000
Fifth Surface
K=5.94882e+000
A4=−5.55947e−002
A6=−6.31900e−003
A8=−1.64814e−002
A10=3.72827e−002
A12=0.00000e+000
Eighth Surface
K=−3.00000e+001
A4=−3.36016e−001
A6=2.40691e−001
A8=−1.01117e−001
A10=1.16935e−002
A12=1.50988e−002
Ninth Surface
K=−6.51594e+000
A4=−1.33093e−001
A6=436202e−002
A8=−2.21686e−002
A10=5.85236e−003
A12=−3.95211e−004
Twelfth Surface
K=−1.77791e+000
A4=−1.24462e−002
A6=−3.51321e−002
A8=8.76536e−003
A10=1.33383e−003
A12=−5.46510e−004
Thirteenth Surface
K=−1.20454e+001
A4=−1.24010e−001
A6=2.82975e−002
A8=4.18931e−003
A10=−1.84819e−003
A12=1.14973e−004
Sixteenth Surface
K=−8.48783e+000

A4=−3.79551e−002
A6=−1.25975e−002
A8=7.43245e−003
A10=−1.20284e−003
A12=5.84609e−005
Various Data
f3.417
Fno. 2.060
ω33.079
y'max 2.244
TL 4.398
BF 0.647
Lens Block Data
Block Surface Focal Length
1 1-4 3.242
2 5-8 −4.258
3 9-12 5.111
4 13-16 −9.552

EXAMPLE 7

Unit: mm
Surface Data
Surface number r d nd vd
Object plane ∞∞
1*1.550 0253 1.60997 60.87
2(Stop)∞0.300 1.48749 70.40
3∞0.050 1.60506 38.03
4*8.727 0.466
5*−2.673 0.050 1.73433 28.48
6∞0.300 1.48749 70.40
7∞0.225 1.74397 44.85
8*−9.578 0.136
9*1.803 0.166 1.61279 60.72
10∞0.300 1.48749 70.40
11∞0.048 1.48749 70.40
12*2.612 0.205
13*1.526 0.167 1.74650 39.26
14∞0.300 1.48749 70.40
15∞0.069 1.73632 43.02
16*1.127 0.365
17∞0.300 1.51600 64.10
18∞0.100
Image plane ∞
Aspheric Surface Data
First Surface
K=6.01845e−001
A4=6.23429e−003
A6=−5.17189e−003
A8=2.55890e−002
A10=−1.36820e−001
A12=0.00000e+000
Fourth Surface
K=3.00000e+001
A4=−3.80854e−002
A6=−8.08638e−002
A8=−6.41584e−002
A10=−5.59564e−002
A12=0.00000e+000
Fifth Surface
K=8.31958e+000
A4=−7.75198e−002
A6=2.39089e−003
A8=6.15111e−003
A10=−1.1.7591e−002
A12=0.00000e+000
Eighth Surface
K=−3.00000e+001
A4=−3.17831e−001
A6=2.50137e−001
A8=−9.60165e−002
A10=1.85760e−002
A12=2.22750e−002
Ninth Surface
K=−4.40151e+000
A4=−1.45101e−001
A6=4.78489e−002
A8=−2.04806e−002
A10=6.05309e−003
A12=−4.20998e−004
Twelfth Surface
K=−231084e+000
A4=−1.66094e−002
A6=−3.80712e−002
A8=8.94230e−003
A10=−1.59274e−003
A12=5.55958e−004
Thirteenth Surface
K=−9.90648e+000
A4=−1.17442e−001
A6=2.72393e−002
A8=3.70320e−003
A10=−1.79962e−003
A12=1.52153e−004
Sixteenth Surface
K=−7.47538e+000
A4=−4.99613e−002
A6=−1.19908e−002
A8=7.61547e−003
A10=−1.17917e−003
A12=5.80836e−005
Various Data
f2.781
Fno. 2.880
ω38.941
y'max 2.244
TL 3.698
BF 0.663
Lens Block Data
Block Surface Focal Length
1 1-4 2.988
2 5-8 −5.281
3 9-12 5.724
4 13-16 −17.749

EXAMPLE 8

Unit: mm
Surface Data
Surface number r d nd vd
Object plane ∞∞
1*1.426 0.300 1.52000 57.00
2(Stop)∞0.300 1.47400 56.40
3∞0.050 1.55000 32.00
4*7.210 0.688
5*−2.345 0.054 1.55000 32.00
6∞0.300 1.47400 56.40
7∞0.300 1.52000 57.00
8*−5.716 0.100
9*2.353 0.246 1.52000 57.00
10∞0.438 1.47400 56.40
11∞0.106 1.52000 57.00
12*2.049 0.145
13*1.496 0.201 1.52000 57.00

14∞0.422 1.47400 56.40
15∞0.063 1.52000 57.00
16*1.410 0.357
17∞0.300 1.51600 64.10
18∞0.102
Image Plane ∞
Aspheric Surface Data
First Surface
K=−1.80349e−001
A4=1.31336e−002
A6=5.09787e−003
A8=2.05659e−002
A10=1.13963e−002
A12=0.00000e+000
Fourth Surface
K=2.34387e+001
A4=5.72689e−003
A6=1.51484e−002
A8=−3.06918e−002
A10=1.70585e−002
A12=0.00000e+000
Fifth Surface
K=5.10401e+000
A4=−2.93333e−002
A6=1.48837e−002
A8=−1.90924e−003
A10=2.78023e−002
A12=0.00000e+000
Eighth Surface
K=−3.00000e+001
A4=−3.16114e−001
A6=2.45397e−001
A8=−9.59528e−002
10=1.39708e−002
A12=1.08602e−002
Ninth Surface
K=−1.15065e+001
A4=−1.50388e−001
A6=5.55256e−002
A8=−2.06017e−002
A10=3.53249e−003
A12=−9.75558e−004
Twelfth Surface
K=−7.78236e+000
A4=−1.19675e−002
A6=−232920e−002
A8=7.84045e−003
A10=6.12696e−004
A12=−5.82408e−004
Thirteenth Surface
K=−627127e+000
A4=−1.16359e−001
A6=2.17572e−002
A8=6.13835e−003
A10=−1.74318e−003
A12=−8.85684e−005
Sixteenth Surface
K=−5.59825e+000
A4=−3.72373e−002
A6=−1.72973e−002
A8=8.49298e−003
A10=1.19232e−003
A12=3.96396e−005
Various Data
f3.565
Fno. 2.470
ω31.833 y' max 2.244
TL 4.370
BF 0.656
Lens Block Data
Block Surface Focal Length
1 1-4 3.329
2 5-8 −7.447
3 9-12 −328.409
4 13-16 26.409

EXAMPLE 9

Unit: mm
Surface Data
Surface number r d nd vd
Object plane ∞∞
1(Stop)∞0.053
2*1.789 0.297 1.52000 57.00
3∞0.305 1.47400 56.40
4∞0.058 1.55000 32.00
5*26.025 0.569
6*−2.478 0.050 1.55000 32.00
7∞0.319 1.47400 56.40
8∞0.300 1.52000 57.00
9*552.419 0.142
10*1.497 0.312 1.52000 57.00
11∞0.395 1.47400 56.40
12∞0.050 1.52000 57.00
13*2.591 0.260
14*1.178 0.202 1.52000 57.00
15∞0.309 1.47400 56.40
16∞0.046 1.52000 57.00
17*1.003 0.538
18∞0.431 1.51600 64.10
19∞0.060
Image Plane ∞
Aspheric Surface Data
Second Surface
K=−5.65901e−001
A4=1.09110e−002
A6=−1.66285e−002
A8=3.26829e−002
A10=−2.71803e−002
A12=0.00000e+000
Fifth Surface
K=1.12444e+001
A4=5.74187e−003
A6=−3.01066e−002
A8=1.65044e−002
A10=−1.66572e−002
A12=0.00000e+000
Sixth Surface
K=8.866620−001
A4=−5.15421e−002
A6=9.74565e−003
A8=−4.23313e−002
A10=4.49480e−002
A12=0.00000e+000
Ninth Surface
K=4.38368e+004
A4=−3.57324e−001
A6=253040e−001
A8=−1.00918e−001
A10=7.93632e−003
A12=1.27856e−002
Tenth Surface
K=−3.78234e+000

A4=-1.20964e-001
A6=5.61392e-002
A8=-3.00977e-002
A10=2.42559e-003
A12=9.44484e-004
Thirteenth Surface
K=-1.42305e+001
A4=3.04354e-002
A6=-3.62786e-002
A8=4.74497e-003
A10=7.17403e-004
A12=-4.34524e-005
Fourteenth Surface
K=-4.88422e+000
A4=-1.68189e-001
A6=1.65102e-002
A8=7.80191e-003
A10=-6.67224e-004
A12=-1.50476e-004
Seventeenth Surface
K=4.76306e+000
A4=-5.05500e-002
A6=-2.44787e-002
A8=1.10948e-002
A10=-1.23611e-003
A12=2.82574e-006
Various Data
f3.418
Fno. 2.470
ω32.966
y'max 2.244
TL 4.547
BF 0.882
Lens Block Data
Block Surface Focal Length
1 2-5 1673
2 6-9 -4.485
3 10-13 5.495
4 14-17 119.498

EXAMPLE 10

Unit: mm
Surface Data
Surface number r d nd vd
Object plane ∞∞
1*1.944 0.300 1.52000 57.00
2∞0.300 1.47400 56.40
3∞0.064 1.55000 32.00
4*-118.952 0.100
5(Stop)∞0.545
6*-2.212 0.073 1.55000 32.00
7∞0.321 1.47400 56.40
8∞0300 1.52000 57.00
9*-175.781 0.166
10*1.404 0.312 1.52000 57.00
11∞0.405 1.47400 56.40
12∞0.063 1.52000 57.00
13*2.528 0.233
14*1.170 0.198 1.52000 57.00
15∞0.308 1.47400 56.40
16∞0.035 1.52000 57.00
17*1.003 0.541
18∞0.436 1.51600 64.10
19∞0.072
Image Plane ∞
Aspheric Surface Data
First Surface
K=-7.15407e-001
A4=7.54788e-003
A6=-2.05108e-002
A8=2.93135e-002
A10=-2.96175e-002
A12=0.00000e+000
Fourth Surface
K=-2.67412e+000
A4=-1.26958e-002
A6=-3.42547e-002
A8=1.34369e-002
A10=-2.10165e-002
A12=0.00000e+000
Sixth Surface
K=1.06166e+000
A4=-5.50222e-002
A6=6.93157e-003
A8=-4.09519e-002
A10=5.58288e-002
A12=0.00000e+000
Ninth Surface
K=4.31616e+001
A4=-3.59685e-001
A6=2.51226e-001
A8=-1.02607e-001
A10=6.24533e-003
A12=1.15289e-002
Tenth Surface
K=-3.31796e+000
A4=-1.16673e-001
A6=5.67553e-002
A8=-2.98548e-002
A10=2.61045e-003
A12=1.09996e-003
Thirteenth Surface
K=-1.30241e+001
A4=2.61905e-002
A6=-3.68914e-002
A8=4.78505e-003
A10=-7.60679e-004
A12=-3.10586e-005
Fourteenth Surface
K=-4.70506e+000
A4=4.66876e-001
A6=1.65823e-002
A8=7.74821e-003
A10=-7.03131e-004
A12=-1.58993e-004
Seventeenth Surface
K=-4.76306e+000
A4=-5.05500e-002
A6=-2.44787e-002
A8=1.10948e-002
A10=-1.23611e-003
A12=2.82574e-006
Various Data
f3.456
Fno. 2.470
ω32.786
y'max 2.244
TL 4.623
BF 0.900
Lens Block Data
Block Surface Focal Length
1 1-4 3.682
2 6-9 -4.076

3 10-13 4.891
4 14-17 105.894

TABLE 1

|  | Example 1 | Example 2 | Example 3 | Example 4 | Example 5 |
|---|---|---|---|---|---|
| (1) νn | V13: 32.0 | V13: 32.0 | V21: 32.0 | V23: 24.0 | V13: 32.0 |
|  | V21: 32.0 | V21: 32.0 | — | — | V21: 32.0 |
| (2) \|rn/f\| | r12: 5.09 | r12: 1.78 | r21: 0.55 | r22: 0.61 | r12: 1.48 |
|  | r21: 0.79 | r21: 0.70 | — | — | r21: 0.66 |
| (3) f1/f | 1.03 | 1.00 | 0.95 | 0.74 | 0.90 |
| (4) f2/f | −1.20 | −1.48 | −1.02 | −1.05 | −1.20 |
| (5) \|f3/f\| | 1.30 | 1.77 | 3.09 | 0.91 | 3.15 |
| (6) (D1a + D2a + D3a)/f | 0.31 | 0.30 | 0.23 | 0.26 | 0.24 |
|  | Example 6 | Example 7 | Example 8 | Example 9 | Example 10 |
| (1) νn | V13: 38.6 | V13: 38.0 | V13: 32.0 | V13: 32.0 | V21: 32.0 |
|  | V21: 27.6 | V21: 28.5 | V21: 32.0 | V21: 32.0 | — |
|  | V43: 33.6 | — | — | — | — |
| (2) \|rn/f\| | r12: 2.59 | r12: 3.14 | r12: 2.02 | r12: 7.61 | r21: 0.64 |
|  | r21: 0.80 | r21: 0.96 | r21: 0.66 | r21: 0.72 | — |
|  | r42: 0.41 | — | — | — | — |
| (3) f1/f | 0.95 | 1.07 | 0.93 | 1.07 | 1.07 |
| (4) f2/f | −1.25 | −1.90 | −2.09 | −1.31 | −1.18 |
| (5) \|f3/f\| | 1.50 | 2.06 | 92.12 | 1.61 | 1.42 |
| (6) (D1a + D2a + D3a)/f | 0.30 | 0.29 | 0.26 | 0.28 | 0.30 |

REFERENCE SIGNS LIST

CU Mobile terminal
LU Image pickup apparatus
LN Image pickup lens
Ci i-th lens block
Li1 ia-th lens portion
Li2 i-th lens substrate
Li3 ib-th lens portion
ST Aperture stop (stop)
SR Image pickup element
SS light-receiving surface
IM Image plane (optical image)
AX Optical axis
B1 Spacer member
1 Signal processing section
2 Control section
3 Memory
4 Operation section
5 Display section

The invention claimed is:

1. An image pickup lens comprising four or more lens blocks,
wherein each of the lens blocks is an optical element comprising
a lens substrate being a parallel flat plate, and
a lens portion or lens portions having positive or negative power and formed on at least one of an object-side surface and image-side surface of the lens substrate,
the lens substrate is different in material from the lens portion or lens portions in each of the lens blocks,
the lens blocks include, in order from an object side, a first lens block, a second lens block, a third lens block, and a fourth lens block, the first lens block has positive power, the second lens block has negative power, a lens block arranged at a closest position to an image side has a concave shape facing the image side in a paraxial region,
at least one of lens portions each having a concave shape in the paraxial region satisfies the following conditional expression (1), and the first lens block satisfies the conditional expression (3):

$$\nu n < 40 \tag{1}$$

$$0.5 < f1/f < 1.5 \tag{3}$$

where νn is an Abbe number of a lens portion having a concave shape in the paraxial region, f1 is a composite focal length of the first lens block, and f is a composite focal length of a total system of the image pickup lens.

2. The image pickup lens of claim 1,
wherein the at least one of lens portions satisfying the conditional expression (1) satisfies the conditional expression (2):

$$0.5 < |rn/f| < 1.0 \tag{2}$$

where rn is a curvature radius of the surface having a concave shape in the paraxial region.

3. The image pickup lens of claim 1, comprising a stop arranged at a closer position to the object side than the second lens block.

4. The image pickup lens of claim 1, satisfying the following conditional expression (3a):

$$0.7 < f1/f < 1.2 \tag{3a}$$

where f1 is a composite focal length of the first lens block.

5. The image pickup lens of claim 1, satisfying the following conditional expression (4):

$$-2.5 < f2/f < -0.9 \tag{4}$$

where f2 is a composite focal length of the second lens block.

6. The image pickup lens of claim 1,
wherein the second lens block has a convex shape facing the image side in the paraxial region.

7. The image pickup lens of claim 1, satisfying the following conditional expression (5):

$$0.8 < |f3/f1 < 3.0 \tag{5}$$

where f3 is a composite focal length of the third lens block.

8. The image pickup lens of claim 1,
wherein the third lens block has a concave shape facing the image side in the paraxial region.

9. The image pickup lens of claim 1,
wherein a rearmost lens surface of the image pickup lens includes an inflection point.

10. The image pickup lens of claim 1, being a four-block structure.

11. The image pickup lens of claim 10, wherein the fourth lens block has negative power.

12. The image pickup lens of claim 1, satisfying the following conditional expression (6):

$$(D1a+D2a+D3a)/f<0.35 \qquad (6)$$

where D1a is a distance along an optical axis between the first lens block and the second lens block, D2a is a distance along the optical axis between the second lens block and the third lens block, and D3a is a distance along the optical axis between the third lens block and the fourth lens block.

13. The image pickup lens of claim 1, wherein all of the lens substrates are parallel flat plates having a same thickness.

14. The image pickup lens of claim 1, wherein each of the lens substrates is formed of a glass material.

15. The image pickup lens of claim 1, wherein each of the lens portions is formed of a resin material.

16. The image pickup lens of claim 15, wherein the resin material is an energy-curable resin material.

17. The image pickup lens of claim 15, wherein inorganic particles with a size of 30 nanometers or less are dispersed in the resin material.

18. The image pickup lens of claim 1, wherein the lens blocks are manufactured by a manufacturing process comprising:
   a step of sealing an area between the lens substrates with a spacer member formed in a grid shape; and
   a step of cutting the lens substrates and the spacer member which have been joined together, along a framework of a grid of the spacer member.

19. An image pickup apparatus characterized by comprising:
   the image pickup lens of claim 1; and
   an image pickup element for converting an optical image formed on an light-receiving surface into electric signal,
   wherein the image pickup lens is arranged so as to form an optical image of a subject on the light-receiving surface of the image pickup element.

20. A mobile terminal comprising the image pickup apparatus of claim 19.

* * * * *